United States Patent
Delos Ayllon et al.

(10) Patent No.: US 10,218,267 B2
(45) Date of Patent: Feb. 26, 2019

(54) POWER CONVERSION DEVICE

(71) Applicant: PHILIPS LIGHTING HOLDING B.V., Eindhoven (NL)

(72) Inventors: Julia Delos Ayllon, Eindhoven (NL); Toni Lopez, Eindhoven (NL); Machiel Antonius Martinus Hendrix, Eindhoven (NL); Eduardo-Jose Alarcon-Cot, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/541,657

(22) PCT Filed: Dec. 23, 2015

(86) PCT No.: PCT/EP2015/081107
§ 371 (c)(1),
(2) Date: Jul. 5, 2017

(87) PCT Pub. No.: WO2016/110413
PCT Pub. Date: Jul. 14, 2016

(65) Prior Publication Data
US 2018/0006552 A1    Jan. 4, 2018

(30) Foreign Application Priority Data
Jan. 7, 2015    (EP) .................................... 15150332

(51) Int. Cl.
*H02M 1/08*    (2006.01)
*H02M 3/07*    (2006.01)
(Continued)

(52) U.S. Cl.
CPC ............. *H02M 3/07* (2013.01); *H02M 1/088* (2013.01); *H05B 33/0815* (2013.01); *H02M 2001/0048* (2013.01)

(58) Field of Classification Search
CPC .................... H02M 1/08; H02M 3/07; H02M 3/155–3/1588; H02M 2001/0048
(Continued)

(56) References Cited

U.S. PATENT DOCUMENTS 8,259,476 B2    9/2012    Ben-Yaakov et al.
2007/0103994 A1*    5/2007    Ahmed .................. G11C 5/145
365/189.11
(Continued)

FOREIGN PATENT DOCUMENTS

WO    2013086445 A1    6/2013

OTHER PUBLICATIONS

Faizan UL HAQ, "Low Power Switched Capacitor DC-DC Converters for Low Power Transceiver Applications", Tampere University of Technology, Master of Science Thesis, pp. 72.
(Continued)

*Primary Examiner* — Wei Chan

(57) ABSTRACT

Power conversion device for supplying a load with a PWM signal, comprising an inductive filter having at least an output configured to be connected to the load, the device comprising: a power conversion module supplied by an input voltage and configured for providing a plurality of output signals wherein one of the plurality of output signals is supplied to the filter; a conversion ratio control stage coupled to the power conversion module; and a controller configured to: determine a requested conversion ratio based on the input voltage and a target reference voltage; and based on the requested conversion ratio, control the conversion ratio control stage to operate in either a first operating mode, whereby the power conversion module provides the output signals in accordance with a first conversion ratio, or
(Continued)

a second operating mode, whereby the power conversion module provides the output signals in accordance with a second conversion ratio.

15 Claims, 16 Drawing Sheets

(51) Int. Cl.
   *H02M 3/155* (2006.01)
   *H02M 1/088* (2006.01)
   *H05B 33/08* (2006.01)
   *H02M 1/00* (2006.01)

(58) Field of Classification Search
   USPC .......................... 323/271, 282, 234, 311, 223
   See application file for complete search history.

(56) References Cited

U.S. PATENT DOCUMENTS

2009/0322384 A1  12/2009  Bradley et al.
2012/0169405 A1  7/2012  Choi

OTHER PUBLICATIONS

Elad Alon et al, "Fully Integrated Switched-Capacitor DC-DC Conversion", Berkeley Wireless Research Center, Univ. of California, Berkeley, pp. 1-30.

Vincent Ng et al, A 92%-Efficiency Wide-Input-Voltage-Range Switched-Capacitor DC-DC Converter, ISSCC 2012/Session 16/Switching Power Control Techniques/16.5,Univ. of California, Berkeley, 2012 IEEE International Solid-State Circuits Conference.

Dragan Maksimovic et al, "Switched-Capacitor DC-DC Converters for Low-Power on Chip Applications", Color Power Electronics Center, Depart of Electrical and Computer Engineering, Univ. of Colorado, Boulder, CO, pp. 1-6.

Vincent Wai-Shan Ng et al, "Switched Capacitor DC-DC Converter: Superior where the Buck Converter has Dominated", Electrical Engineering and Computer Sciences, Univ. of California at Berkeley, Technical Report No. UCB/EECS-2011-94, Aug. 17, 2011, http://www.eecs.berkeley.edu/Pubs/TechRpts/2011/EECS-2011-94.html.

Pavan Kumar et al, "Novel Switched Capacitor Based Triple Output Fixed Ratio Converter (TOFRC)", IEEE, 2012, pp. 2352-2366.

Uno Masatoshi et al, "Multi-port Converter Integrating Boost and Switched Capacitor Converters for Single-Cell Battery Power System in Small Satellite", 2013 IEEE ECCE Asia Downunder, IEEE, Jun. 3, 2013, pp. 747-752, XP032475409.

\* cited by examiner

POWER CONVERSION DEVICE

CROSS-REFERENCE TO PRIOR APPLICATIONS

This application is the U.S. National Phase application under 35 U.S.C. § 371 of International Application No. PCT/EP2015/081107, filed on Dec. 23, 2015 which claims the benefit of European Patent Application No. 15150332.3, filed on Jan. 7, 2015. These applications are hereby incorporated by reference herein.

TECHNICAL FIELD

The current invention relates to the field of integrated power converters. The current invention can notably apply to drive circuits for Light Emitting Diode (LED) light sources. More specifically, the current invention relates to a compact and efficient power conversion device.

BACKGROUND

Applications requiring a high level of integration of power conversion modules, for example using Switched Mode Power Supplies (SMPS), can resort to power converters such as Switched Capacitor Converters (SCC), which can provide highly efficient DC-to-DC voltage conversion with only the use of capacitors and switches.

Notably, the Solid State Lighting (SSL) Industry's demand for small and compact power management units for LEDs is increasing. LEDs require that a power supply be delivered in the form of a constant current, as efficiently as possible. Ideally, LED drivers comparable in size to the LEDs themselves would represent a significant breakthrough enabling new lighting concepts. Such a solution will require a system with a high level of reliability and efficiency, in order to fit the requirements of life-time, size and heat dissipation.

LED drivers can be based on SMPS. SMPS can comprise SCCs, which allow a high level of integration and achieve large power conversion ratios, but have the drawback of providing plural discrete conversion ratios, which do not make SCCs suitable for applications where a fine regulation of the output power is required.

SMPS can also comprise conventional Inductive Converters, comprising at least one inductor and at least one switch. Inductive Converters allow a fine regulation of the output power and can efficiently provide an arbitrary conversion ratio, but one drawback of Inductive Converters is that they cannot be easily integrated in compact structures.

SUMMARY

Hybrid Switched Capacitor Converters (H-SCCs) use the pulsed width modulated voltages, available in the internal nodes of SCCs, combined with at least one filter inductor to extend the conversion range and increase the efficiency of the SCCs.

However the inventors have observed that the use of H-SCCs can result in a large efficiency drop when operated in extreme duty cycles, limiting the possible conversion range of the converter.

Embodiments of the present invention described below advantageously enable high performance operation (high conversion efficiency and smooth output current (low ripple)) over a wide dynamic range of Vin/Vo ratio.

According to one aspect of the invention there is provided a power conversion device, for supplying a load with a Pulse Width Modulation (PWM) signal, comprising an inductive output filter having at least an output configured to be connected to the load, the power conversion device comprising: a conversion ratio control stage supplied by a DC input voltage (Vin) and configured for providing an output voltage; a power conversion module supplied by the output voltage and configured for providing a plurality of output signals (PWM1, . . . , PWMn), wherein one of the plurality of output signals is supplied to the output filter; and a controller configured to: determine a requested conversion ratio (m) based on the DC input voltage (Vin) and a target reference voltage (Vset); and based on the determined requested conversion ratio, control the conversion ratio control stage to operate in one of a first operating mode and a second operating mode, wherein when the conversion ratio control stage operates in the first operating mode the power conversion module provides said plurality of output signals in accordance with a first conversion ratio (M1), and when the conversion ratio control stage operates in the second operating mode the power conversion module provides said plurality of output signals in accordance with a second conversion ratio (M2).

In an exemplary embodiment, the power conversion device comprises an input for connection to a voltage supply that supplies said DC input voltage, and the conversion ratio control stage is arranged for connection between said input and the voltage supply. In an alternative exemplary embodiment, the conversion ratio control stage is integrated into the power conversion module.

The conversion ratio control stage may comprise a plurality of switches, and the controller may control the operating mode of the conversion ratio control stage by controlling a switch configuration of the conversion ratio control stage.

The controller may be further configured to compare the requested conversion ratio with a plurality of conversion ratio thresholds to determine an operating zone of the power conversion module.

The controller may be configured to control the conversion ratio control stage to operate in one of the first operating mode and the second operating mode based on the determined operating zone.

The controller may comprise a plurality of comparators each of said plurality of comparators configured to compare the requested conversion ratio with one of the plurality of conversion ratio thresholds.

The controller may comprise a divider stage configured to compute the requested conversion ratio by dividing the target reference voltage (Vset) with the DC input voltage (Vin).

The power conversion device may further comprise a selection module, wherein the power conversion module is coupled to the output filter via the selection module, wherein the controller is further configured to control the selection module to select one output signal among said plurality of output signals (PWM1, . . . , PWMn) based on the determined requested conversion ratio. Alternatively the power conversion device may further comprise a wiring of said one of the plurality of output signals to the output filter.

In one embodiment, the first conversion ratio is $1/n$ where n is an integer value greater than or equal to 2, and the second conversion ratio is $1/(n-0.5)$. In another embodiment, the first conversion ratio is $1/n$ where n is an integer value greater than or equal to 2, and the second conversion ratio is $1/(n-1)$.

In an exemplary embodiment, the plurality of output signals have a level amplitude that is a fraction of the input voltage (Vin) level, each output signal being floating with a bias component split in a plurality of steps ranging from a determined lowest fraction level amplitude to a determined highest fraction level amplitude.

The power conversion module may comprise a Switched Capacitor Converter (SCC), comprising a plurality of switches controlled by the controller.

The power conversion module may be based on a Dickson ladder topology comprising a first set of switches and a second set of switches.

In an exemplary embodiment, the plurality of output signals (PWM1, . . . , PWMn) are formed by voltages (vx1, . . . , vxn) at respective internal nodes (N1, . . . , N4, SN1) of the power conversion module.

According to one aspect of the invention there is provided a light module comprising at least one light source and a power conversion device for supplying said at least one light source with a Pulse Width Modulation (PWM) signal, the power conversion device comprising: an inductive output filter having at least an output configured to be connected to the at least one light source; a power conversion module supplied by the output voltage and configured for providing a plurality of output signals (PWM1, . . . , PWMn), wherein one of the plurality of output signals is supplied to the output filter; a conversion ratio control stage coupled to the power conversion module; and a controller configured to: determine a requested conversion ratio (m) based on the DC input voltage (Vin) and a target reference voltage (Vset); and based on the determined requested conversion ratio, control the conversion ratio control stage to operate in one of a first operating mode and a second operating mode, wherein when the conversion ratio control stage operates in the first operating mode the power conversion module provides said plurality of output signals in accordance with a first conversion ratio (M1), and when the conversion ratio control stage operates in the second operating mode the power conversion module provides said plurality of output signals in accordance with a second conversion ratio (M2).

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

For an LED driver power converter, a fundamental requirement is the ability to operate in multiple modes, which can cover various electrical specifications e.g. input or output voltage, conversion ratio, efficiency, etc.

A SCC may produce a regulated output voltage by either stepping up or stepping down the input voltage.

The efficiency, η, of an SCC can be expressed as function of the voltage transfer ratio independent of switch resistances:

$$\eta = \frac{V_o}{M \cdot V_{in}} = \frac{V_o}{V_{set}}$$

where $V_o$ is the output voltage of the converter, $V_{in}$, is the input voltage of the converter, $V_{set}$ is the target voltage and M is the conversion ratio.

A multimode power converter may have multiple desired operating conditions, which are separated by undesired operating conditions. In particular, a multimode power converter may be able to supply power in a desired fashion to at least one load coupled to least one output of the converter when the voltage, required by the load is either in range $V_{o1}$ or in range $V_{o2}$, with:

$$V_a > V_{o1} > V_b$$

$$V_c > V_{o2} > V_d$$

wherein $V_c > V_b$.

So, when the voltage required by the load is in the range $V_{o3}$ where:

$$V_b < V_{o3} < V_c$$

the converter may not operate at all, or only with very limited performance.

These voltage "gaps" cause the efficiency of the SCC to fall rapidly, even to zero.

Figure 1:
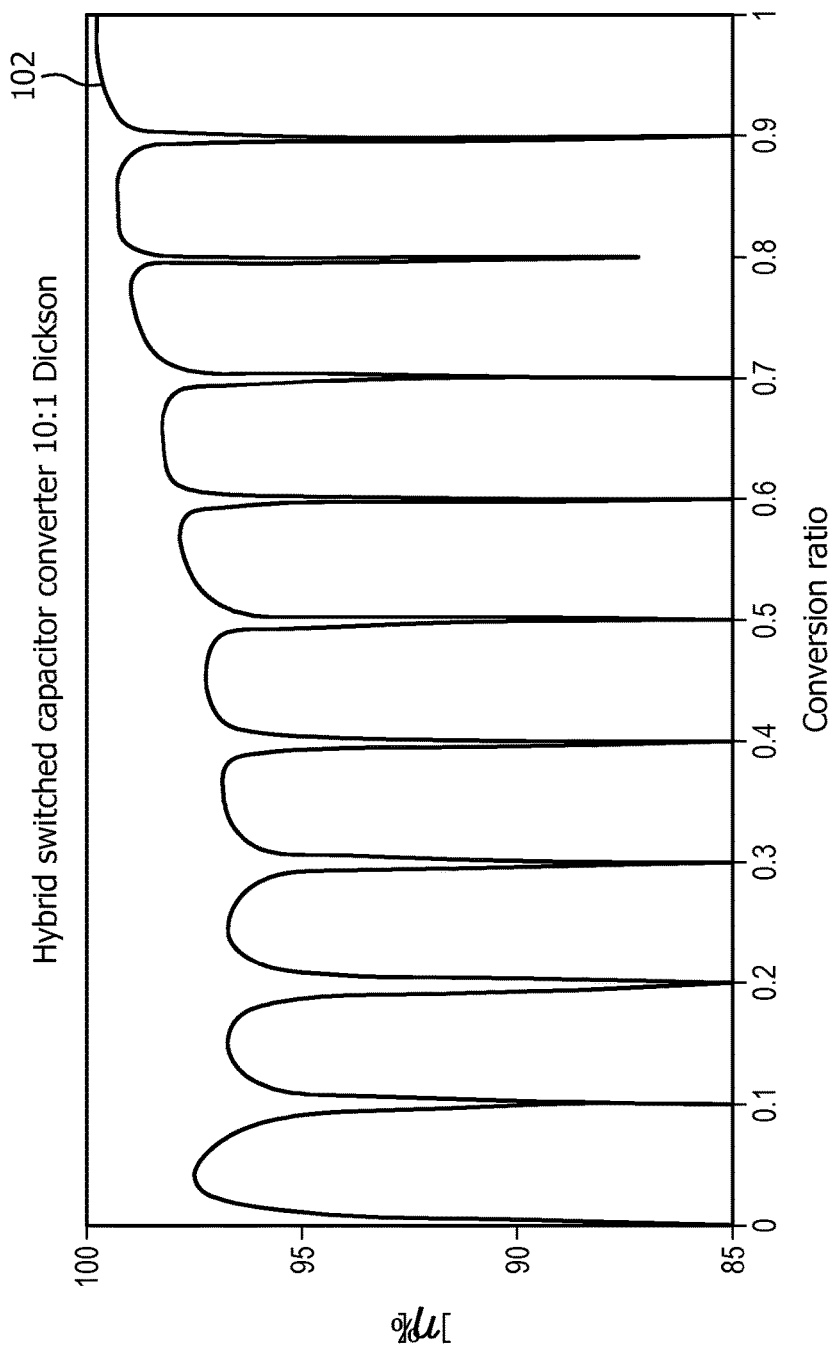
FIG. 1 illustrates a typical curve of efficiency with conversion ratio and duty cycle of a H-SCC operating as a 10:1 voltage divider.

FIG. 1 shows an efficiency vs conversion ratio curve 102 of a Hybrid Switched Capacitor Converter (H-SCC) when operating as a 10:1 voltage divider (i.e. is designed with ten operating zones which can provide ten ranges of conversion ratio—this enables the power converter to be applied in wide voltage range applications). The conversion ratio is proportional to the duty cycle within each operating zone, thus tuning the duty cycle e.g. using Pulse Width Modulation (PWM), is the general method to achieve a desired conversion ratio.

When using an H-SCC, the conversion ratio is limited in the boundary between the different voltage ranges offered by the SCC stage. In the boundary regions, the SCC stage operates with extreme duty cycles, typically below 10% or above 90%. This leads to a large increase of the equivalent output impedance of the SCC stage, producing a dramatic drop of the converter efficiency, thus the power converter achieves very limited performance at these boundaries. These efficiency "gaps" or "notches" are shown in FIG. 1 and are addressed by embodiments of the present invention.

Whilst FIG. 1 illustrates the efficiency "gaps" with respect to a Hybrid Switched Capacitor Converter (H-SCC) when operating as a 10:1 voltage divider, persons skilled in the art will appreciate that these efficiency "gaps" will also be observed when the Hybrid Switched Capacitor Converter (H-SCC) provides a difference conversion ratio. For example when the Hybrid Switched Capacitor Converter (H-SCC) operates as a 5:1 voltage divider (i.e. is designed with five operating zones which can provide five ranges of conversion ratio), at the boundaries between the different voltage ranges the drop in efficiency of the converter described above will be observed.

Embodiments of the present disclosure relate to addressing the efficiency "gaps" described above, through the control of a conversion ratio control stage which is configured to control the conversion ratio of the H-SCC.

In embodiments, the conversion ratio control stage is coupled to the H-SCC, in particular the conversion ratio control stage is coupled to a SCC stage of the H-SCC.

The conversion ratio control stage 204 may be coupled to the H-SCC 206 in a number of ways. The conversion ratio control stage 204 may be placed at the power line input before the main power stage (H-SCC) as shown in FIG. 2a, or integrated within said main power stage as shown in FIG. 2b.

Figure 2A:
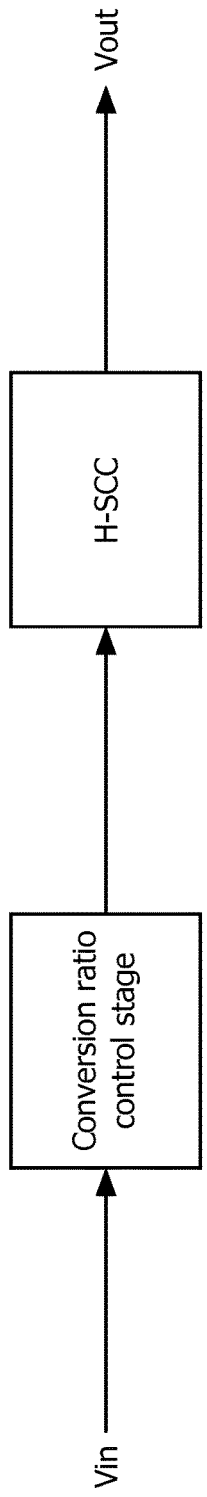
FIGS. 2a & 2b illustrate example architectures of exemplary embodiments of the present invention.
Figure 2B:
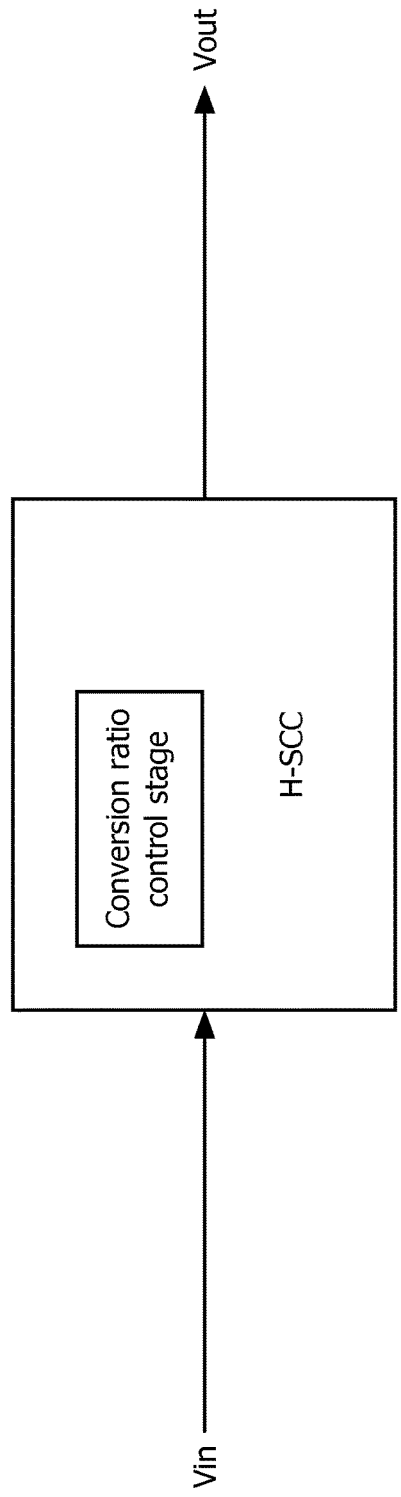

Embodiments are first described with respect to the arrangement shown in FIG. 2a.

Figure 2C:
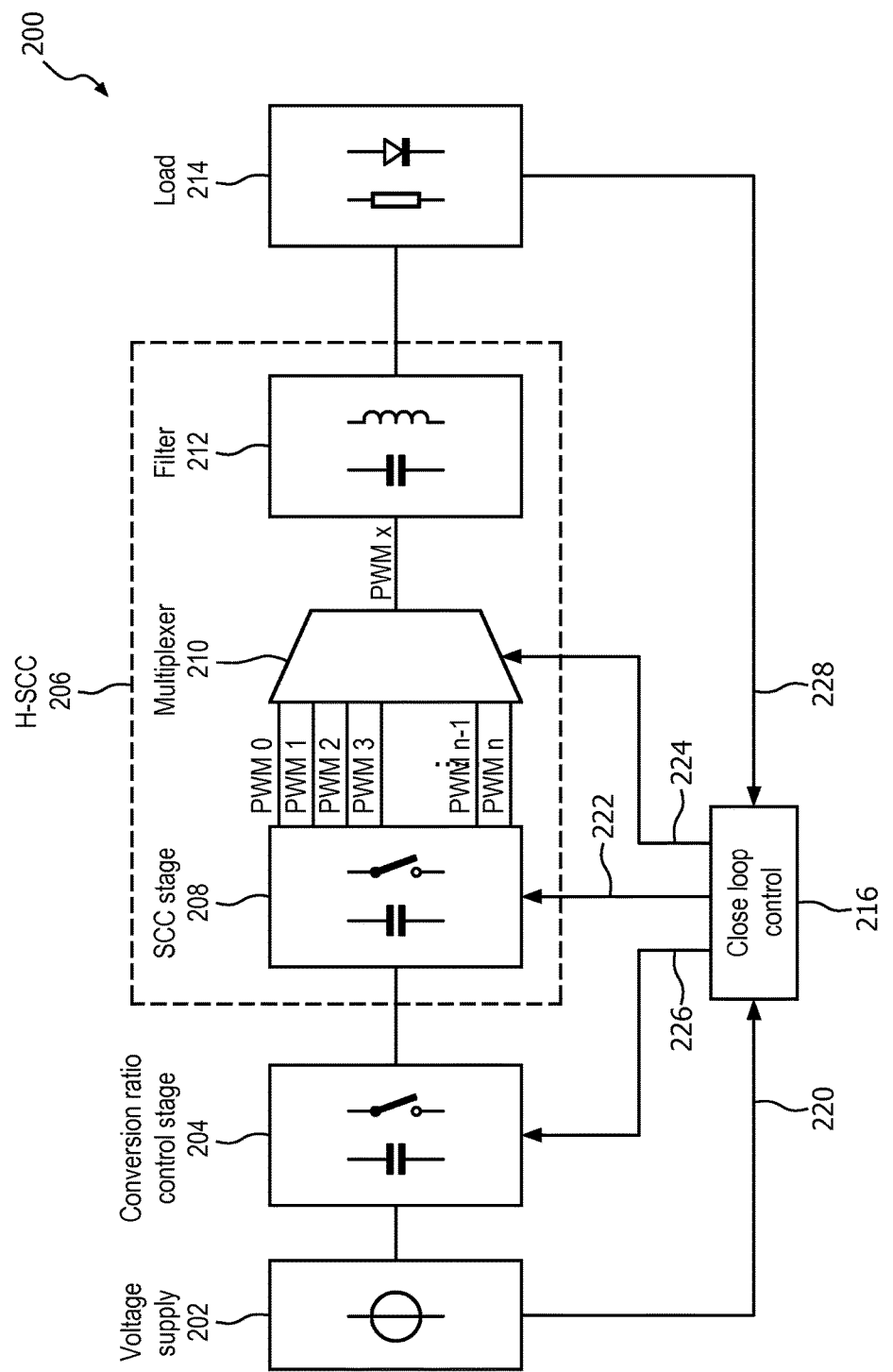
FIG. 2c shows a power conversion device.

Reference is now made to FIG. 2c which illustrates a power conversion device 200 in accordance with the arrangement shown in FIG. 2a. The power conversion device 200 comprises an input for connection to a voltage source 202 that supplies a DC voltage, hereinafter designated as Vin, and a load 214 which can for example be a resistive load, or a light emitting device. The light emitting device may comprise one or more light sources e.g. a single LED or a set of LEDs, for example a string of LEDs. Whilst an LED light source is referred to herein, any suitable light source may be driven by the power conversion device 200 e.g. an Organic Light Emitting Diode (OLED) or a laser diode, The power conversion device 200 comprises a conversion ratio control stage 204, a H-SCC 206 and a controller 216.

The H-SCC 206 comprises a SCC stage 208 (otherwise referred to herein as a power conversion module) having a plurality of outputs PWM1, PWM2, . . . PWMn delivering PWM voltages. According to the current invention, one of the plurality of outputs PWM1, PWM2, . . . PWMn can be selected by means of adequate selection means, such as a selection module, and connected to an output, for example through an output filter 212. For example, the plurality of outputs PWM1, PWM2, . . . PWMn can be connected to a plurality of respective inputs of a multiplexer 210 (otherwise referred to herein as a selection module), which delivers at its output one PWM voltage PWMx from said plurality of inputs as detailed further below. The multiplexer 210 can thus be a n:1 multiplexer. It shall be understood that the H-SCC 206 does not necessarily comprise a multiplexer as in the illustrated exemplary embodiments described hereafter. The selection module can for example be formed by an adequate wiring of one of the outputs PWM1, PWM2, . . . PWMn to the output, through the output filter 212.

The output of the multiplexer 210 is connected to the output filter 212. The output filter 212 can notably comprise at a minimum either one capacitor or one inductor.

The controller 216 allows a control loop by controlling the SCC stage 208 and the multiplexer 210 as a function of input signals representative of a sensed voltage supplied by the power supply 202, DC output voltage of the H-SCC 206, hereinafter designated as vdc, and/or a signal representative of a sensed load voltage, load current or load power, for example a load voltage, hereinafter designated as vo.

The controller 216 receives as a first input 220, the voltage supplied by the power supply 202. The controller 216 also receives as a second input 228, the DC output voltage of the H-SCC 206.

A first output 222 of the controller 216 allows control of the SCC stage 208 by controlling the duty cycle of the SCC stage 208 by means of analogue control.

A second output 224 of the controller 216 allows control of the multiplexer channel of the multiplexer 210.

As shown in FIG. 2c, the conversion ratio control stage 204 is placed at the power line input before the H-SCC. In embodiments described below the conversion ratio control stage 204 is implemented using a half-point SCC 204. A third output 226 of the controller 216 allows control of the half-point SCC 204, which will be described in further detail below.

Figure 3:
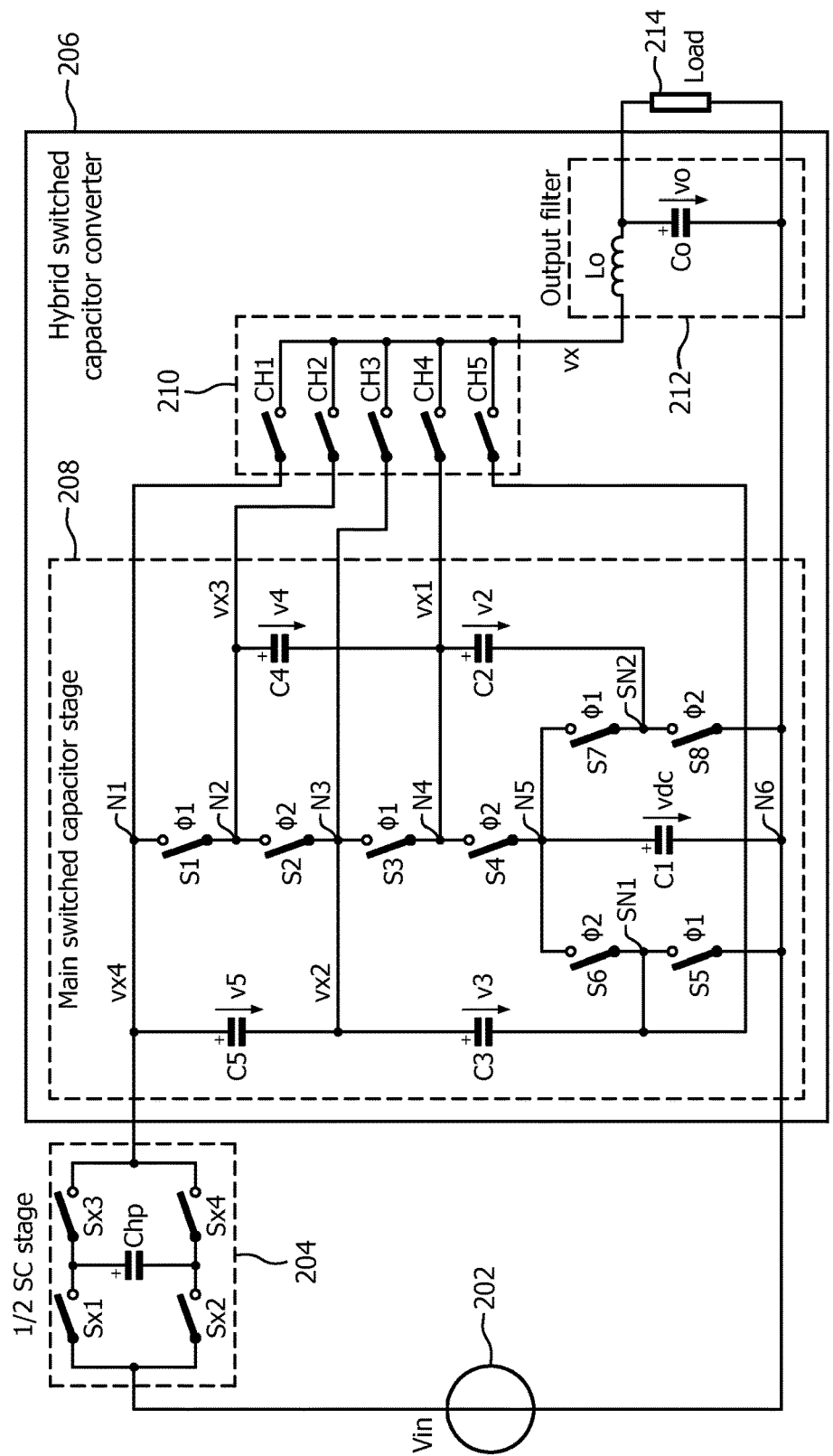
FIG. 3 shows the components of the power conversion device according to an exemplary embodiment of the present invention.

Reference is now made to FIG. 3 which shows an electrical diagram illustrating the half-point SCC 204 and the H-SCC 206 in more detail in an exemplary embodiment of the invention.

The half-point SCC 204 comprises four switches Sx1, Sx2, Sx3, and Sx4 and a single capacitor Chp. The half-point SCC 204 can be controlled in accordance with one of four switch configurations. A switch configuration of the conversion ratio control stage 204 is used herein to refer to the sequence of opening and closing of the switches of the conversion ratio control stage. For example, a switch configuration of the half-point SCC 204 is used herein to refer to the sequence of opening and closing of the switches Sx1-Sx4.

In a first switch configuration all of the switches Sx1, Sx2, Sx3, and Sx4 are turned off during a first time phase $\Phi1$, and during a second time phase $\Phi2$ switches Sx1 and Sx3 are turned on whilst switches Sx2 and Sx4 are turned off. That is, during the second time phase $\Phi2$ the voltage Vin is supplied to a first central node N1 of the H-SCC 206.

In a second switch configuration all of the switches Sx1, Sx2, Sx3, and Sx4 are turned off during a first time phase $\Phi1$, and during a second time phase $\Phi2$ switches Sx2 and Sx4 are turned on whilst switches Sx1 and Sx3 are turned off. That is, during the second time phase $\Phi2$ the voltage Vin is supplied to the first central node N1 of the H-SCC 206.

In a third switch configuration switches Sx1 and Sx4 are turned on and switches Sx2 and Sx3 are turned off during a first time phase Φ1, and during a second time phase Φ2 switches Sx1 and Sx4 are turned off and switches Sx2 and Sx3 are turned on.

In a fourth switch configuration switches Sx1 and Sx4 are turned off and switches Sx2 and Sx3 are turned on during a first time phase Φ1, and during a second time phase Φ2 switches Sx1 and Sx4 are turned on and switches Sx2 and Sx3 are turned off.

The SCC stage 208 is adapted to provide a plurality of PWM output signals as mentioned above, having a level amplitude that is a fraction of the input DC voltage Vin. In this exemplary embodiment the PWM output signals are square-waveform voltages with an amplitude that is a fraction of the input DC voltage Vin. Each of the square-wave voltages is floating with a bias component equally split, in the non-limiting illustrated exemplary embodiment, in a plurality of steps ranging from the lowest fraction amplitude to the highest fraction amplitude. Any of the voltages can be selected by means of the multiplexer 210 and can be output through an output of the multiplexer 210, the output of the multiplexer 210 being connected to the output filter 212, thus providing a continuous voltage to the load 214.

In the non-limiting exemplary embodiment illustrated by FIG. 3, the H-SCC 206 is formed by a SCC stage comprising a plurality of switches and capacitors. For example, the SCC stage 208 comprises a so-called Dickson Ladder converter. It shall be observed that other SCC topologies can be used, such as standard ladder, Fibonacci, or series-parallel topologies for instance.

The illustrated exemplary embodiment more specifically uses a Dickson Ladder topology based on five capacitors C1 to C5 and eight switches S1 to S8 of the single pole, single throw type. More specifically, the SCC stage 208 comprises two flying ladders: a first flying ladder comprises four capacitors C3 and C5 put in series, and a second flying ladder comprises two capacitors C2 and C4 put in series.

The SCC stage 208 further comprises six central nodes N1 to N6. The first central node N1 receives the voltage output of the half-point SCC 204. A first switch S1 selectively connects the first central node N1 to the second central node N2. A second switch S2 selectively connects the second central node N2 to the third central node N3. A third switch S3 selectively connects the third central node N3 to the fourth central node N4. A fourth switch S4 selectively connects the fourth central node N4 to the fifth central node N5. A first capacitor C1 is placed between the fifth central node N5 and a sixth central node N6 that is connected to a reference voltage, for example to ground.

The first flying ladder comprising the capacitors C3 and C5 is located between the first central node N1 and a first secondary node SN1. A fifth switch S5 selectively connects the first secondary node SN1 to the sixth central node N6; a sixth switch S6 selectively connects the first secondary node SN1 to the fifth central node N5.

The second flying ladder comprising the capacitors C2 and C4 is located between the second central node N2 and a second secondary node SN2. A seventh switch S7 selectively connects the second secondary node SN2 to the fifth central node N5; an eighth switch S8 selectively connects the second secondary node SN2 to the sixth central node N6.

The two flying ladders are oppositely phased, thanks to an adequate sequence of opening and closing the switches S1 to S8. For example, all the odd-numbered switches S1, S3, . . . , S7 can be in a given state during a first time phase Φ1, for instance turned on, while all the even-numbered switches S2, S4, . . . , S8 can be in the opposite, for instance turned off; during a successive second time phase Φ2, the states of all the switches can be reversed. The controller 216 is configured to generate the PWM signals to control the switches S1 to S8 in the first time phase Φ1 and the second time phase Φ2 (i.e. to control the switch configuration of the SCC stage 208) as described above.

The signals delivered from the central nodes N1 to N4 form as many outputs of the SCC stage 208, and are the internal nodes of the switched capacitor converter forming the H-SCC 206 in the illustrated embodiment, designated as voltages vx1 to vx4 in FIG. 3, are connected to as many inputs of the multiplexer 210. In this exemplary embodiment, the multiplexer 210 thus comprises four switches, allowing selectively connecting one of the four inputs to an output vx, and comprises an additional switch connected to the first secondary node SN1 for a further improved definition or dynamics of the voltage level applied to the output filter 212. The structure of the multiplexer 210 can be simplified through reducing the number of switches, depending on the requirements with regards to the load operation.

As described above, the multiplexer 212 is a possible implementation of a selection module. An even simpler architecture of a H-SCC 206 can be realized by providing an adequate wiring of a chosen output among the plurality of outputs PWM1, PWM2, . . . PWMn of the power conversion module, which may satisfy the operating requirements of the load for some applications. In such a case, the selection module is formed by said adequate wiring. Such an embodiment notably brings the advantage of still providing a cost-efficient and compact architecture that can be adapted to a given load for example through a simple additional step of wiring in a manufacturing process.

Still in the exemplary embodiment illustrated by FIG. 3, the DC output voltage of the SCC stage 208 referred to above as vdc is the voltage across the first capacitor C1, i.e. the voltage between the fifth central node N5 and the sixth central node N6.

As in the exemplary embodiment illustrated by FIG. 3, the output filter 212 can comprise a filter inductance Lo and a filter capacitor Co, the filter inductance Lo being connected between the output of the multiplexer 210 and the load 214 in parallel with the filter capacitor Co.

Therefore a further advantage of the current invention is that the ripple of the voltage vx signal at the output of the multiplexer 210 is dramatically lowered, which allows alleviating the requirements for the filter inductance Lo, in terms of bulk, in such a way that the inductance Lo can be easily integrated in a small package, with a size that is similar to the size of the load 214 itself, for example formed by a LED module. Typically, an inductance value is directly proportional to the voltage ripple, therefore if the voltage ripple is reduced by a factor N, then the size of the inductor can be reduced by the same factor N.

Such small ripples also provide the advantage of allowing reducing the electromagnetic emissions, therefore improving ElectroMagnetic Interference (EMI). They also provide the further advantage that voltage and current stresses in the switches comprised in the power conversion device can be dramatically reduced, therefore notably improving life-time of the power conversion device.

In accordance with embodiments of the present disclosure, the operation of the H-power conversion device 200 is controlled in dependence on the switch configuration of the half-point SCC 204.

That is, the conversion ratio of the power conversion device 200 can be configured by controlling the switch configuration of the half-point SCC 204 as described in Table 1 below.

TABLE 1

Switch configurations of the half-point SCC 204

| Conversion Ratio | Phase Φ1 | | | | Phase Φ2 | | | |
|---|---|---|---|---|---|---|---|---|
| | Sx1 | Sx2 | Sx3 | Sx4 | Sx1 | Sx2 | Sx3 | Sx4 |
| 5:1 | OFF | OFF | OFF | OFF | ON | OFF | ON | OFF |
| 5:1 | OFF | OFF | OFF | OFF | OFF | ON | OFF | ON |
| 4.5:1 | ON | OFF | OFF | ON | OFF | ON | ON | OFF |
| 4.5:1 | OFF | ON | ON | OFF | ON | OFF | OFF | ON |

As shown in Table 1, when the half-point SCC 204 operates in a first operating mode (in accordance with either the first or second switch configurations described above i.e. is turned off), the power conversion device 200 operates as a 5:1 voltage divider i.e. a divide-by-five voltage divider (has a first conversion ratio, M1 (1/5)). When the half-point SCC 204 operates in a second operating mode (in accordance with either the third or fourth switch configurations described above i.e. is turned on), the conversion ratio of the power conversion device 200 is reduced by 0.5, in this case the power conversion device 200 operates as a 4.5:1 voltage divider i.e. a divide-by-4.5 voltage divider (has a second conversion ratio, M2 (1/4.5)).

When the half-point SCC 204 is configured in accordance the third of fourth switch configuration the capacitor Chp is now included in the SCC topology. During one phase the capacitor Chp is connected between the input supply Vin and the central node N1, and during the other phase the capacitor Chp is connected with reversed polarity between Vin and the central node N1. As will be apparent to persons skilled in the art, this makes the power conversion device 200 change its conversion ratio by half a step When operating as a 5:1 voltage divider, the output voltages of the SCC stage 208 can be found:

$$vx4: \quad \frac{4}{5}V_{in}(\phi 1) \quad \text{and} \quad V_{in}(\phi 2)$$

$$vx3: \quad \frac{4}{5}V_{in}(\phi 1) \quad \text{and} \quad \frac{3}{5}V_{in}(\phi 2)$$

$$vx2: \quad \frac{2}{5}V_{in}(\phi 1) \quad \text{and} \quad \frac{3}{5}V_{in}(\phi 2)$$

$$vx1: \quad \frac{2}{5}V_{in}(\phi 1) \quad \text{and} \quad \frac{1}{5}V_{in}(\phi 2)$$

$$SN1: \quad 0(\phi 1) \quad \text{and} \quad \frac{1}{5}V_{in}(\phi 2)$$

When operating as a 4.5:1 voltage divider, the output voltages of the SCC stage 208 can be found:

$$vx4: \quad \frac{8}{9}V_{in}(\phi 1) \quad \text{and} \quad \frac{10}{9}V_{in}(\phi 2)$$

$$vx3: \quad \frac{8}{9}V_{in}(\phi 1) \quad \text{and} \quad \frac{6}{9}V_{in}(\phi 2)$$

$$vx2: \quad \frac{4}{9}V_{in}(\phi 1) \quad \text{and} \quad \frac{6}{9}V_{in}(\phi 2)$$

$$vx1: \quad \frac{4}{9}V_{in}(\phi 1) \quad \text{and} \quad \frac{2}{9}V_{in}(\phi 2)$$

$$SN1: \quad 0(\phi 1) \quad \text{and} \quad \frac{2}{9}V_{in}(\phi 2)$$

The controller 216 is configured to provide a certain conversion ratio, m, in dependence on the output voltage, $V_o$, and the input voltage $V_{in}$, supplied by the voltage supply 202, to control either the load voltage or output current, whereby m=$V_o/V_{in}$. The controller 216 can achieve a certain conversion ratio, m, by controlling (i) the duty cycle of the PWM signal (that controls switches S1 to S8) using the first output of the controller 216, (ii) the multiplexer channel of the multiplexer 210 using the second output of the controller 216, and (iii) the half-point SCC 204 using the third output of the controller 216.

Figure 4:
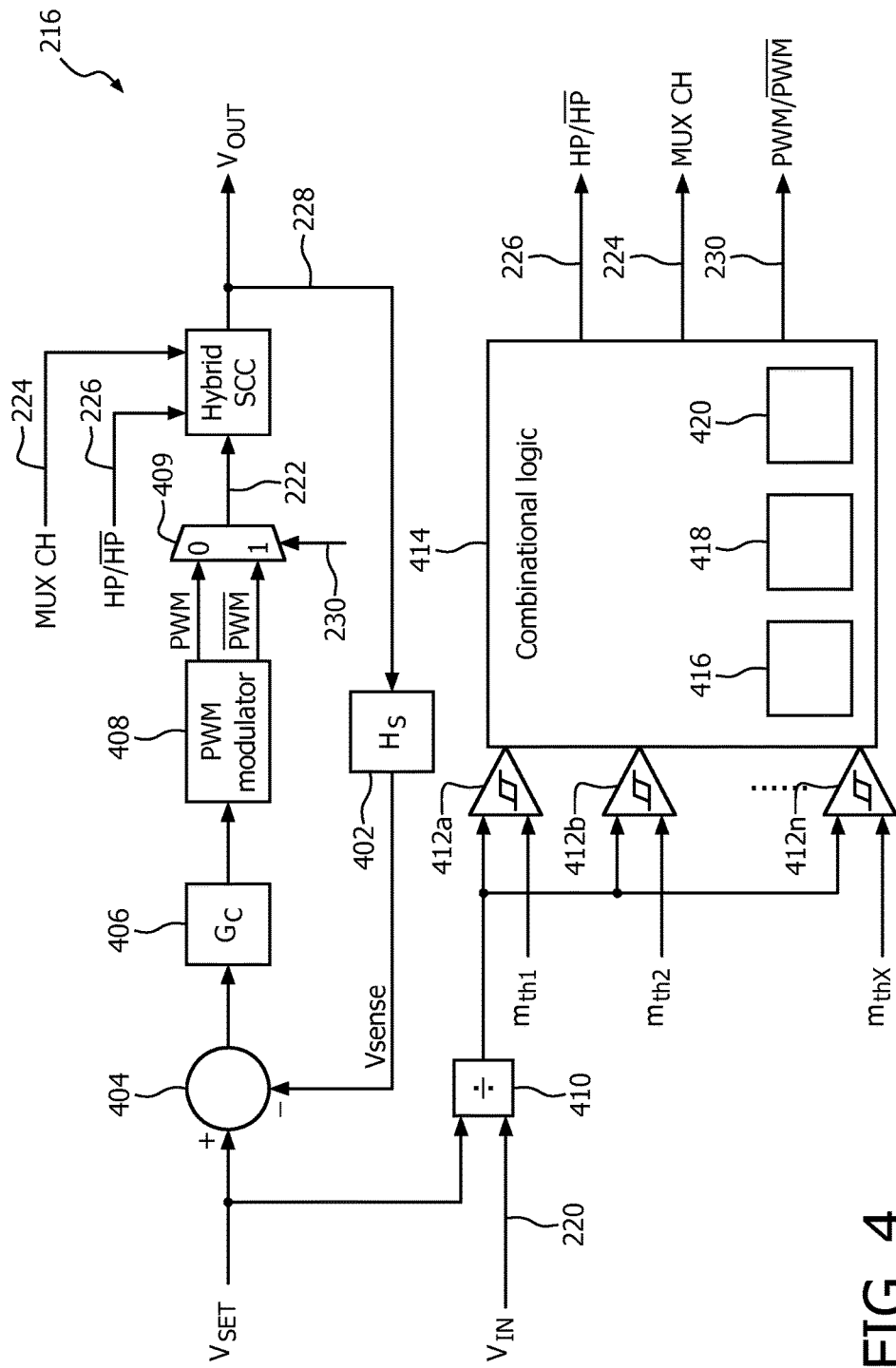
FIG. 4 illustrates a diagram of a controller of the a power conversion device.

FIG. 4 shows a diagram illustrating the controller 216 in an exemplary embodiment of the invention.

The control scheme implemented by the controller 216 is composed of two control loops.

The first control loop is used for controlling the duty cycle of the H-SCC 206 and enables a tight regulation at the output. The output (in this case the output voltage $V_{out}$) is sensed using a sensor 402 with gain H(s) which outputs a sensed voltage $V_{sense}$. A comparator 404 compares the sensed voltage $V_{sense}$ with the target reference voltage $V_{set}$. The comparator 404 outputs an error signal which is the difference between $V_{sense}$ and $V_{set}$. The error signal is fed to a compensator 406 and then modulated by a PWM modulator 408 to generate a complementary pair of PWM signals. A multiplexer 409 selectively supplies one of the PWM signals to the odd numbered switches of the H-SCC 206 in the first time phase Φ1 (whereby the inverse of this PWM signal is supplied to the even numbered switches of the H-SCC 206 in the second time phase Φ2).

It should be understood that the signal 222 output from the controller 216 corresponds to phase ϕ1 of the H-SCC 206 (odd switches) and phase ϕ2 is always the complementary signal with a death-time to avoid overlapping of the clock signals. The generation of ϕ2 is not shown in FIG. 4, it should be understood that is embedded inside the H-SCC 206 (otherwise the circuit will not work).

The PWM modulator 408 generates two signals PWM and $\overline{PWM}$ signals, from the controller 216. The multiplexer 409 provides selection of the signal depending on the selected channel. Channel 0 routes the PWM signal to the output, and channel 1 routes $\overline{PWM}$ signal to the output. This multiplexer 409 is driven by the PWM/$\overline{PWM}$ signal 230 output from combinational logic 414. The combinational logic 414 comprises a logic stage 416 (which is described in further detail below) for outputting the PWM/$\overline{PWM}$ signal 230.

Depending on the internal node selected in the H-SCC 206 the plant has different behavior and the right PWM signal must be provide to enable the close loop regulation.

The odd switching nodes (vx1 and vx3) have an inverse behavior, thus the mean node voltage decreases as the duty cycle increases, therefore when one of these nodes is selected the H-SCC plant should be driven by the inverse PWM signal $\overline{PWM}$PWM.

The even nodes (vx2 and vx4) have direct behavior, thus the mean node voltage increases as the duty cycle increases, therefore when one of these nodes is selected the H-SCC plant should be driven by the direct PWM signal PWM.

Figure 5:
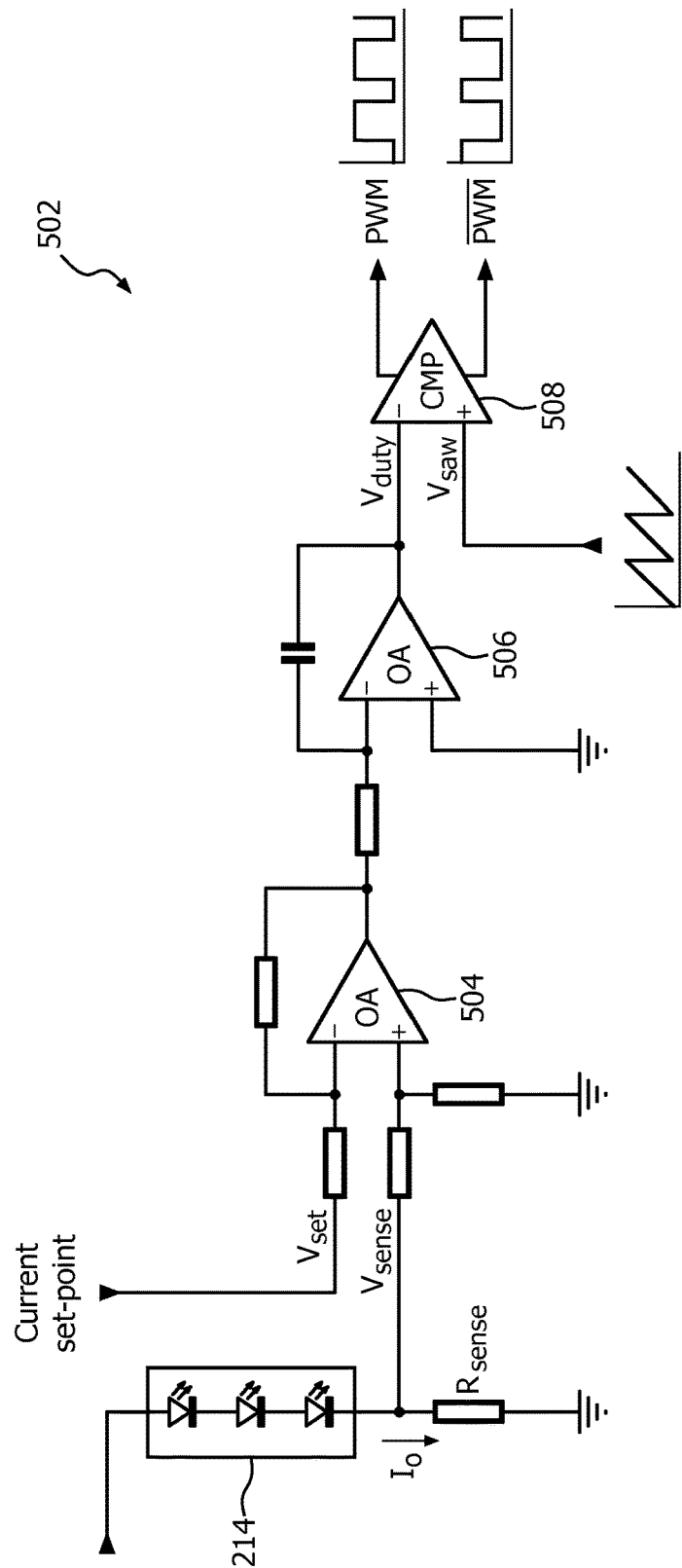
FIG. 5 illustrates a diagram of a control loop implemented by the controller of the a power conversion device.

FIG. 5 shows a diagram illustrating how the first control loop may be implemented by the controller 216.

As illustrated in FIG. 5, the current flowing through a load 214, for example a LED string, can be sensed by measuring a sense voltage $V_{sense}$ across a sense resistor $R_{sense}$. The sense voltage $V_{sense}$ can be subtracted from the Current Set Point voltage $V_{set}$ using an amplifier circuit 504.

A Proportional-Integral (PI) controller can be formed by the amplifier circuit 504 and an integrator circuit 506, for example based on Operational Amplifiers (OA). The PI controller allows minimizing the error between the two measured voltages $V_{sense}$ and $V_{set}$; the response of the PI controller can be adjusted through modifying the characteristics of the passive components, i.e. the resistors and capacitors in the illustrated exemplary embodiment, connected to the OAs.

The output voltage $V_{duty}$ of the PI controller has a magnitude corresponding to the duty cycle operation of the power converter. The signals for driving the switches of the SCC stage 208 can be obtained by comparing the output voltage Vduty of the PI controller with a saw-tooth wave voltage Vsaw, by means of a comparator circuit 508 (PWM modulator), thus outputting the two complementary PWM signals PWM and $\overline{PWM}$. The frequency of the saw-tooth signal determines the frequency of the PWM signals and its amplitude determines the proportional gain of the PI controller. A dead time can be added between the phase driving signals to prevent shoot through of the switches.

Whilst the compensator 506 has been shown in the form of an integrator circuit that forms a PI controller with the amplifier circuit 504. It will be appreciated that the compensator may include further circuitry not shown in FIG. 5 to provide a control system known to persons skilled in the art. For example the compensator may additionally comprise a derivative circuit to form a PID controller.

Returning to FIG. 4, we now refer to the second control loop that is used by the controller 216.

The second control loop adjusts the channel of the multiplexer 210 and half-point SCC 204 to make the H-SCC 206 operate in the correct and the most efficient operating zone. The second control loop comprises a divider stage 410 which receives as inputs the input voltage $V_{in}$, supplied by the voltage supply 202, and the target reference voltage $V_{set}$. The divider stage 410 computes a requested conversion ratio, m by dividing the target reference voltage $V_{set}$ with the input voltage $V_{in}$, (m=Vset/Vin).

The computed requested conversion ratio, m is compared to a plurality of conversion ratio thresholds $m_{th1}$-$m_{thx}$, using a plurality of comparators 412a-412n. This comparison provides the operating zone of the H-SCC 206 and the PWM signal that is provided to the odd switches in phase ϕ1, the channel of the multiplexer 210 and the half-point SCC 204 are controlled according to this operating zone. The term operating zone is used herein to refer to a range of conversion ratios.

That is, based on the operating zone of the H-SCC 206 the PWM signal that is provided to the odd switches in phase ϕ1, the channel of the multiplexer 210, and the operating mode of the half-point SCC 204 is selected. This information can be contained in a look up table, made with combinational logic 614.

The combinational logic 614 comprises a logic stage 416 to provide the output 230 to control the PWM signal that is provided to the odd switches in phase ϕ1, a logic stage 418 to provide an output 224 to control the channel of the multiplexer 210, and a logic stage 420 to provide an output 226 to control the operating mode of the half-point SCC 204. That is, in dependence on the operating zone of the H-SCC 206, the controller 216 controls the half-point SCC 204 to operate in either a first operating mode (i.e. in accordance with either the first or second switch configuration described above) to control the H-SCC 206 to operate as a 5:1 voltage divider, or a second operating mode (i.e. in accordance with either the third or fourth switch configuration described above) to control the H-SCC 206 to operate as a 4.5:1 voltage divider.

The values of the thresholds $m_{th1}$-$m_{thx}$ can be obtained using available model data available to persons skilled in the art or based on simulations of the H-SCC 206 (e.g. on an efficiency vs conversion ratio curve of the power conversion device 200). The comparators can include a hysteresis to prevent instabilities (i.e. Schmitt triggers), and some filtering can be added for filtering the signal indicative of the requested conversion ratio m, that is output from the divider stage 410.

Figure 6:
FIG. 6 illustrates a truth table of combinational logic of the controller according to an exemplary embodiment of the present invention.

A truth table 600 for the combinational logic 414 is shown in FIG. 6.

For a H-SCC 206 to operate as a 5:1 voltage divider, seven comparators 412 are used which are configured with one of seven conversion ratio threshold limits (indicated by $m_{th1}$-$m_{th7}$) which define a plurality of operating zones that the H-SCC stage 206 may operate in.

Each of the seven comparators 412 provide an output signal (m1-m7) that is received as an input into the combinational logic 614. Each of the logic stages 416, 418, and 420 receive the signals (m1-m7) as inputs.

The first row of the truth table 600 for the combinational logic 614 illustrates that when the computed requested conversion ratio, m, is less than the conversion ratio threshold limit $m_{th1}$, the output of comparator 412a is high (m1=1) therefore the H-SCC stage 206 is operating in a first operating zone, and the combinational logic 414 is configured to provide a 'high' PWM 230 to control the multiplexer 409 to output the $\overline{PWM}$ signal to the odd switches in phase ϕ1, a 'low' output on output 226 to control the half-point SCC 204 to operate in the first operating mode, and selects the first channel (CH1) of the multiplexer 210 using outputs (ch0, ch1 and ch2).

The second row of the truth table 600 for the combinational logic 614 illustrates that when the computed requested conversion ratio, m, is between conversion ratio threshold limit $m_{th1}$ and conversion ratio threshold limit $m_{th2}$, the output of comparator 412b is high (m2=1) therefore the H-SCC stage 206 is operating in a second operating zone, and the combinational logic 414 is configured to provide a 'low' PWM 230 to control the multiplexer 409 to output the PWM signal to the odd switches in phase ϕ1, a 'high' output on output 226 to control the half-point SCC 204 to operate in the second operating mode, and selects the second channel (CH2) of the multiplexer 210 using outputs (ch0, ch1 and ch2).

From the above description, it will be apparent from the truth table 600 how the combinational logic 614 is configured to operate when the H-SCC stage 206 is operating in the third to seventh operating zones.

In dependence on outputs ch2, ch1 and ch0 224 of the logic stage 418 one of the multiplexer channels is selected. In particular, the first channel (CH1) of the multiplexer 210 is selected when ch2=0, ch1=0 and ch0=0, the second channel (CH2) of the multiplexer 210 is selected when ch2=0, ch1=0 and ch0=1, the third channel (CH3) of the multiplexer 210 is selected when ch2=0, ch1=1 and ch0=0, the fourth channel (CH4) of the multiplexer 210 is selected when ch2=0, ch1=1 and ch0=1, and the fifth channel (CH5) of the multiplexer 210 is selected when ch2=1, ch1=0 and ch0=0.

Figure 7A:
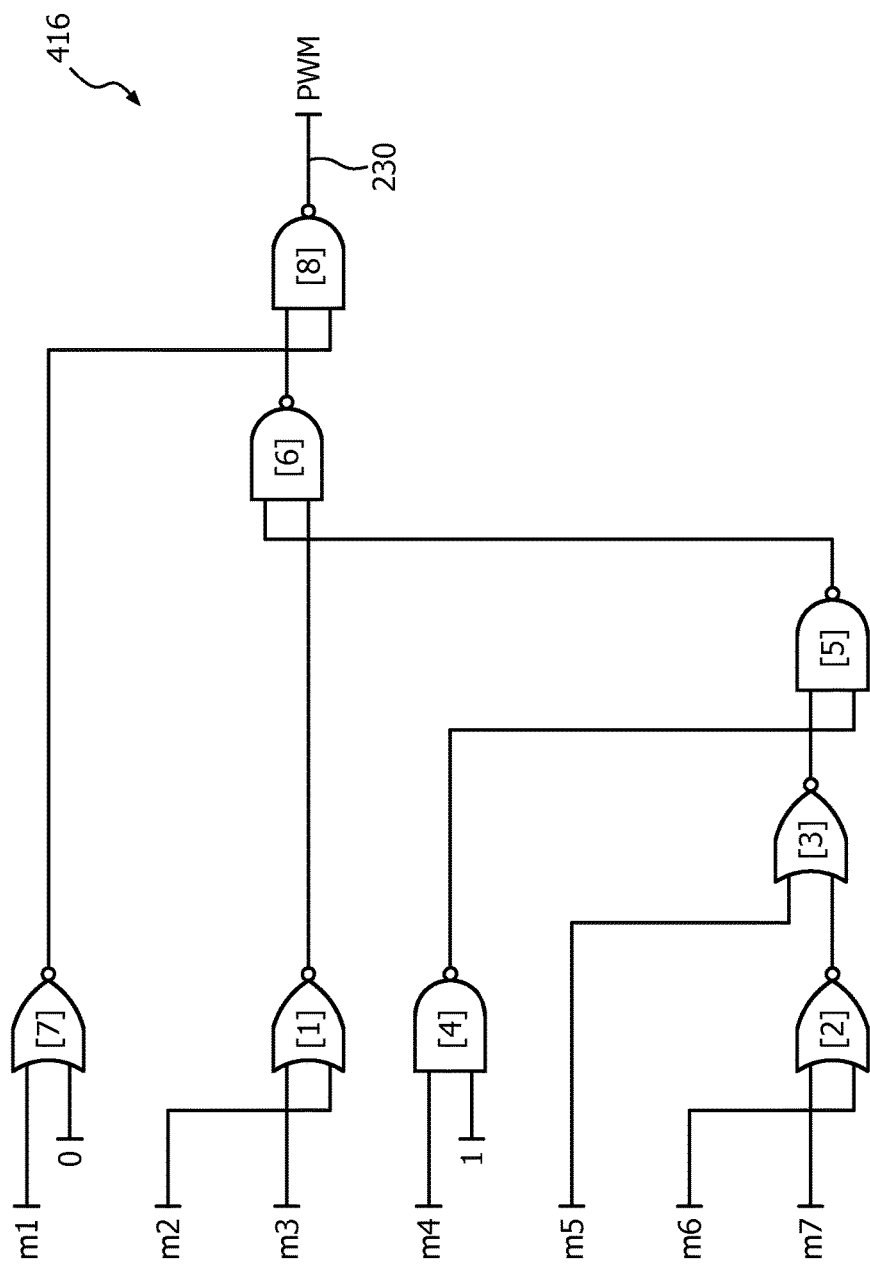
FIG. 7a-c illustrate example logic stages of the combinational logic according to an exemplary embodiment of the present invention.

An example logic stage 416 is shown in FIG. 7a. The logic stage 416 receives as inputs the signals m1-m7 that are output from the seven comparators 412. An arrangement of logic gates is provided in the logic stage 416 in order to adhere to the truth table 600. Whilst an example logic stage 416 is shown in FIG. 7a embodiments extend to other arrangements of logic gates that adhere to the truth table 600.

Figure 7B:
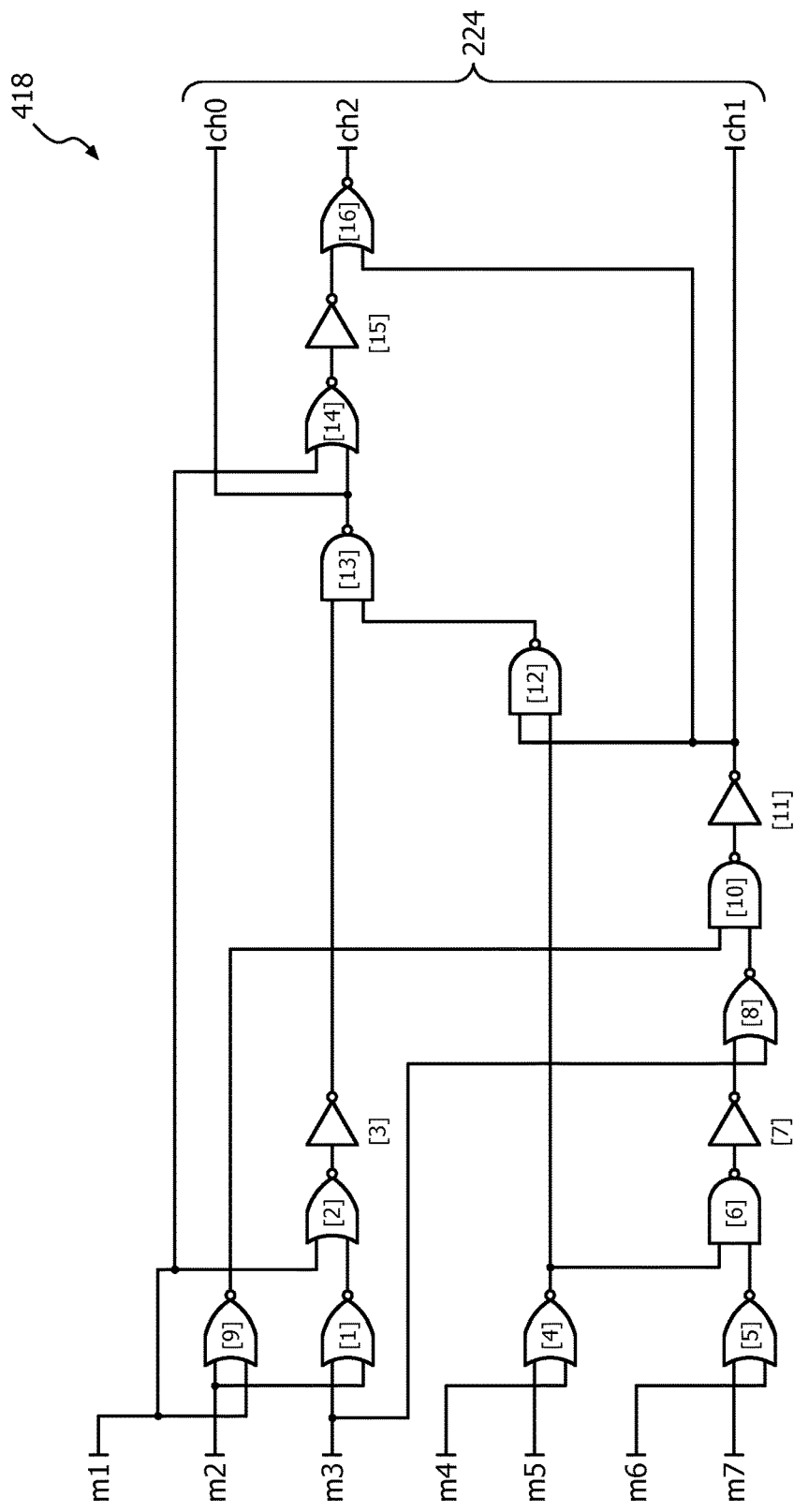

An example logic stage 418 is shown in FIG. 7b. The logic stage 418 receives as inputs the signals m1-m7 that are output from the seven comparators 412. An arrangement of logic gates is provided in the logic stage 418 in order to adhere to the truth table 600. Whilst an example logic stage 418 is shown in FIG. 7b embodiments extend to other arrangements of logic gates that adhere to the truth table 600.

Figure 7C:
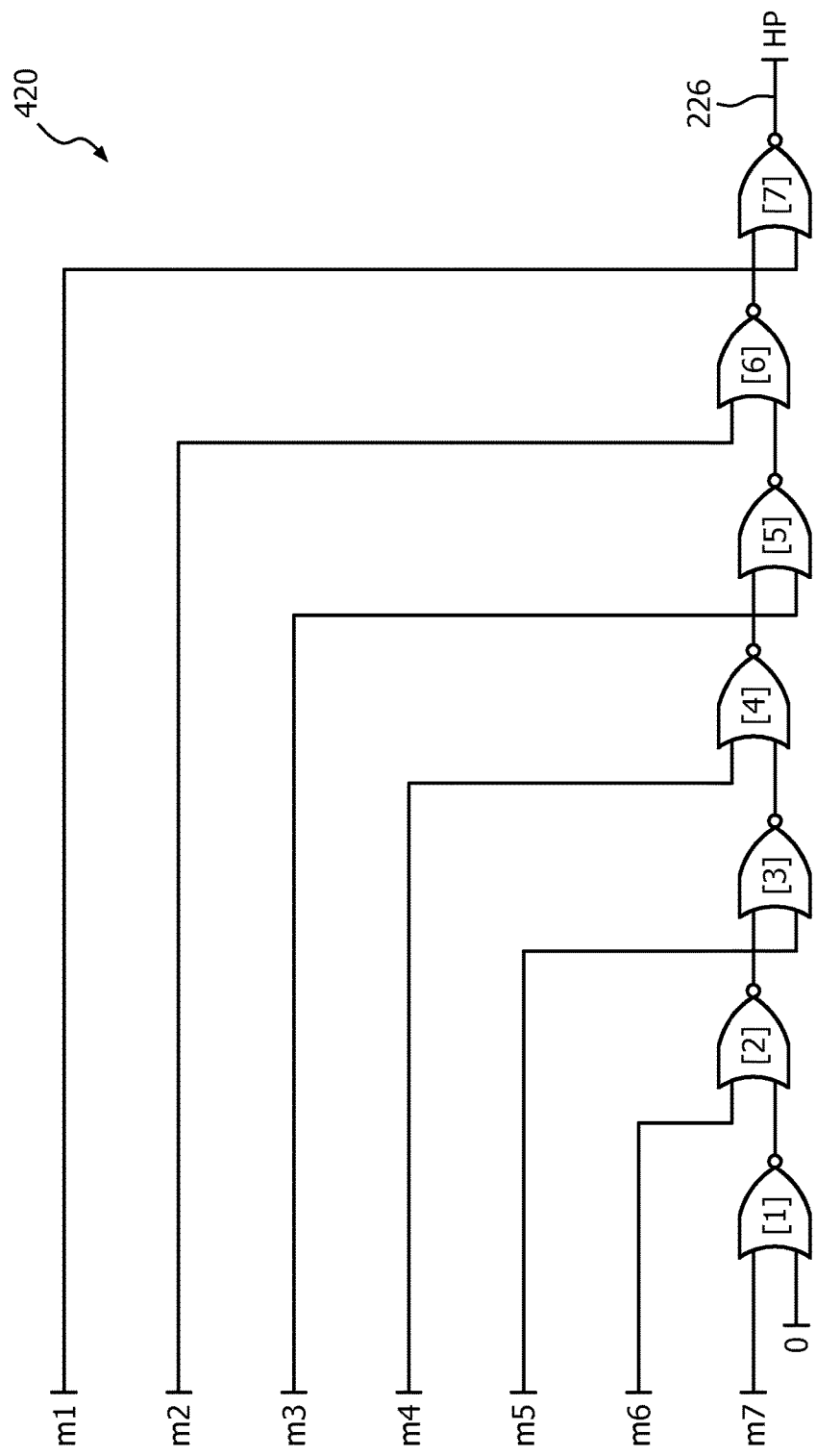

An example logic stage 420 is shown in FIG. 7c. The logic stage 420 receives as inputs the signals m1-m7 that are output from the seven comparators 412. An arrangement of logic gates is provided in the logic stage 420 in order to adhere to the truth table 600. Whilst an example logic stage 420 is shown in FIG. 7b embodiments extend to other arrangements of logic gates that adhere to the truth table 600.

When the H-SCC stage 206 is operating in operating zones OZ0, OZ2, OZ4, and OZ6 the controller 216 controls the H-SCC stage 206 to operate as a 5:1 voltage divider (first conversion ratio, M1). When the H-SCC stage 206 is operating in operating zones OZ1, OZ3, OZ5, and OZ7 the controller 216 controls the H-SCC stage 206 to operate as a 4.5:1 voltage divider (second conversion ratio, M2).

Figure 8:
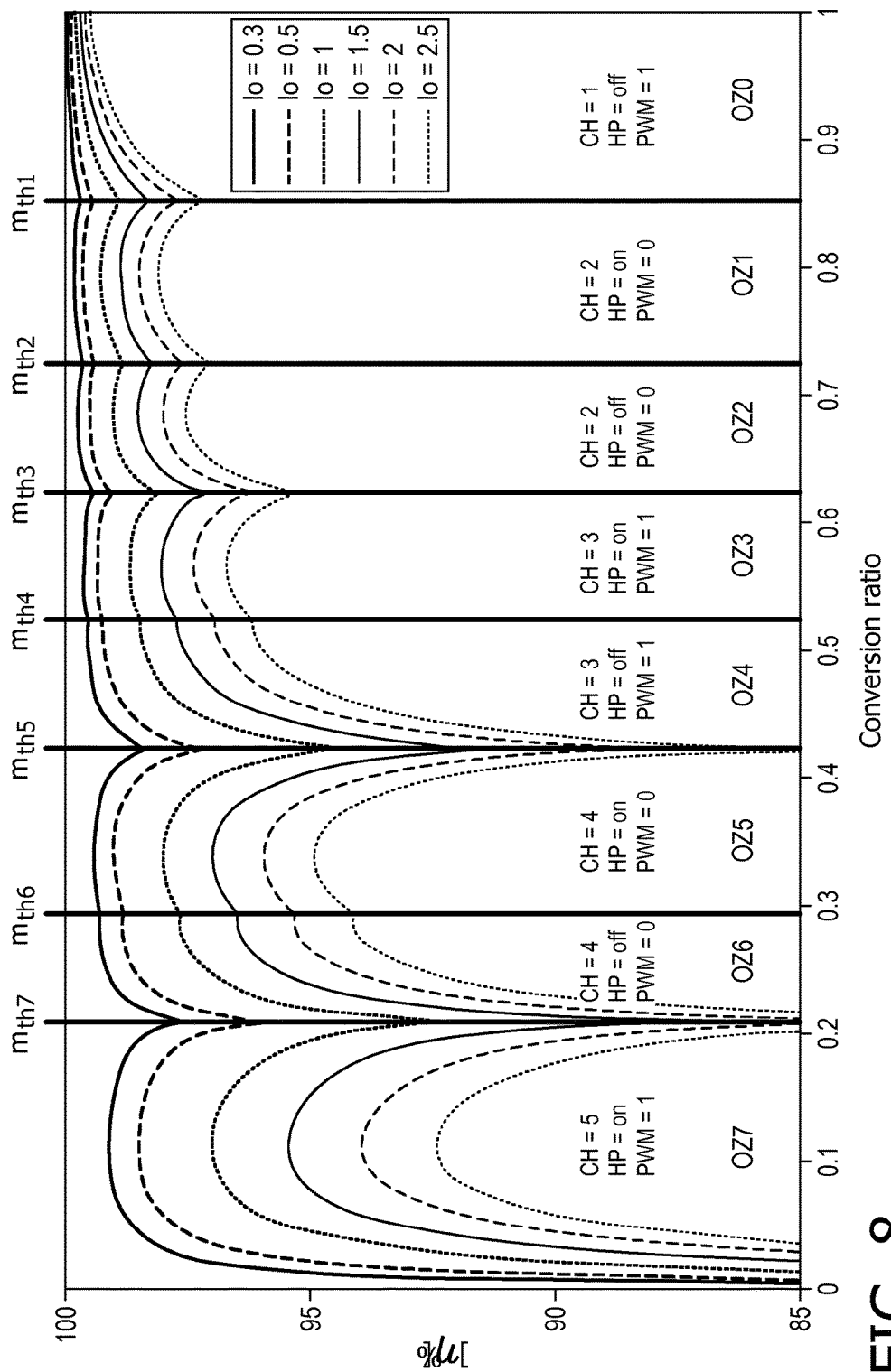
FIG. 8 illustrates an efficiency vs conversion ratio curve of a H-SCC of the power conversion device when operating as a 5:1 voltage divider and as a 4.5:1 voltage divider.

FIG. 8 illustrates efficiency vs conversion ratio curves of the power conversion device 200 operating in accordance with embodiments described above.

As shown in FIG. 8, the controller 216 controls the half-point stage 204 to operate in the first operating mode to control the power conversion device 200 to operate as a 5:1 voltage divider (conversion ratio, M1) when the H-SCC 206 is operating in one of the plurality of operating zones (marked as HP=off) in FIG. 8 that are defined by particular conversion ratio threshold limits. Furthermore, the controller 216 controls the half-point stage 204 to operate in the second operating mode to control the power conversion device 200 to operate as a 4.5:1 voltage divider (conversion ratio, M2) when the H-SCC 206 is operating in one of the plurality of operating zones (marked as HP=on) in FIG. 8 that are defined by particular conversion ratio threshold limits.

As shown in FIG. 8, this switching between the H-SCC 206 operating to provide the first conversion ratio M1 and the second conversion ratio M2 continues as the requested conversion ratio, m, is increased.

From FIG. 8 it can be seen from the curves that the power conversion device 200 operating in accordance with embodiments described above enable efficiency performance to be further improved whereby the drops in efficiency are almost removed from the entire conversion range.

FIG. 8 indicates the outputs of the combinational logic 614 when the requested conversion ratio, m is between each of the conversion ratio threshold ranges. For example, when the requested conversion ratio m is between conversion ratio thresholds $m_{th1}$ and $m_{th2}$, the H-SCC 206 operates in operating zone OZ1 and thus the multiplexer 409 is controlled to provide the $\overline{PWM}$ signal to the odd switches in phase φ1, the combinational logic 614 selects channel 2 of the multiplexer 210 and the half-point SCC 204 is turned on (operates in the second operating mode).

It can be seen that for each curve representing a different output current $I_O$, the efficiency notches are always located at the same conversion ratio.

Figure 9:
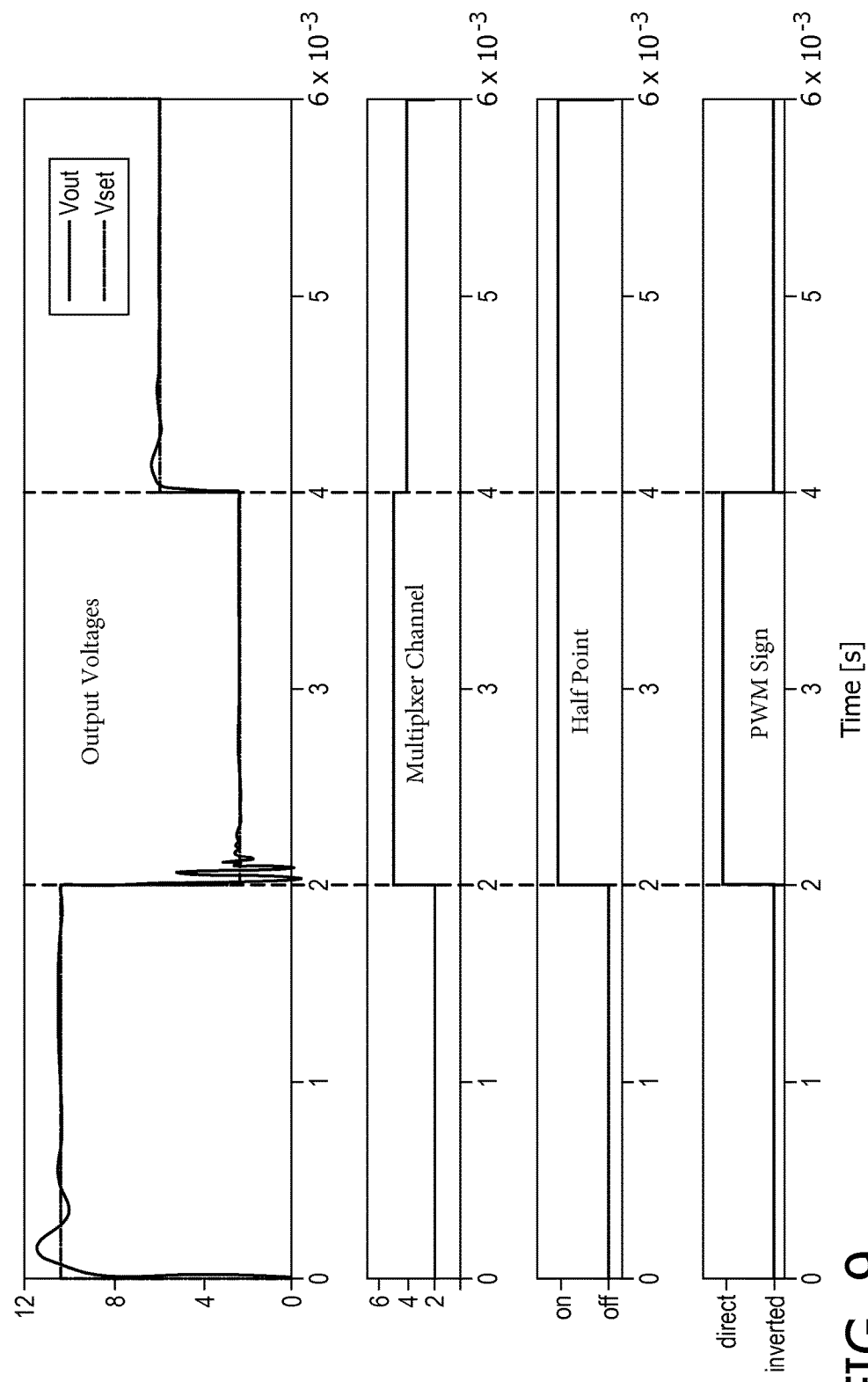
FIG. 9 illustrates simulation results of a H-SCC stage that is configured to operate as a 5:1 voltage divider and 4.5:1 voltage divider.

FIG. 9 illustrates simulation results of the H-SCC stage 206 that is configured to operate as a 5:1 voltage divider and 4.5:1 voltage divider, in dependence on the target reference voltage $V_{set}$ being varied.

As shown in FIG. 9, when the target reference voltage $V_{set}$ is set at a first voltage level, the H-SCC stage 206 operates in operating zone OZ2 and after a period of time, the output voltage settles at the target reference voltage $V_{set}$. When the target reference voltage $V_{set}$ is changed to a second voltage level, the H-SCC stage 206 operates in operating zone OZ7 and after a period of time, the output voltage settles at the target reference voltage $V_{set}$. When the target reference voltage $V_{set}$ is changed to a third voltage level, the H-SCC stage 206 operates in operating zone OZ5 and after a period of time, the output voltage settles at the target reference voltage $V_{set}$.

Whilst embodiments have been described above with reference to the conversion ratio control stage 204 being implemented using a half-point SCC 204 to shift the conversion ratio of the H-SCC stage 206 by 0.5. Embodiments of the present invention are not limited to such a conversion ratio control stage. The swapping of the conversion ratio of the H-SCC stage 206 advantageously achieves a variation in the efficiency curves with respect to the duty cycle. A similar effect can be achieved with other implementations of the conversion ratio control stage 204.

Figure 10:
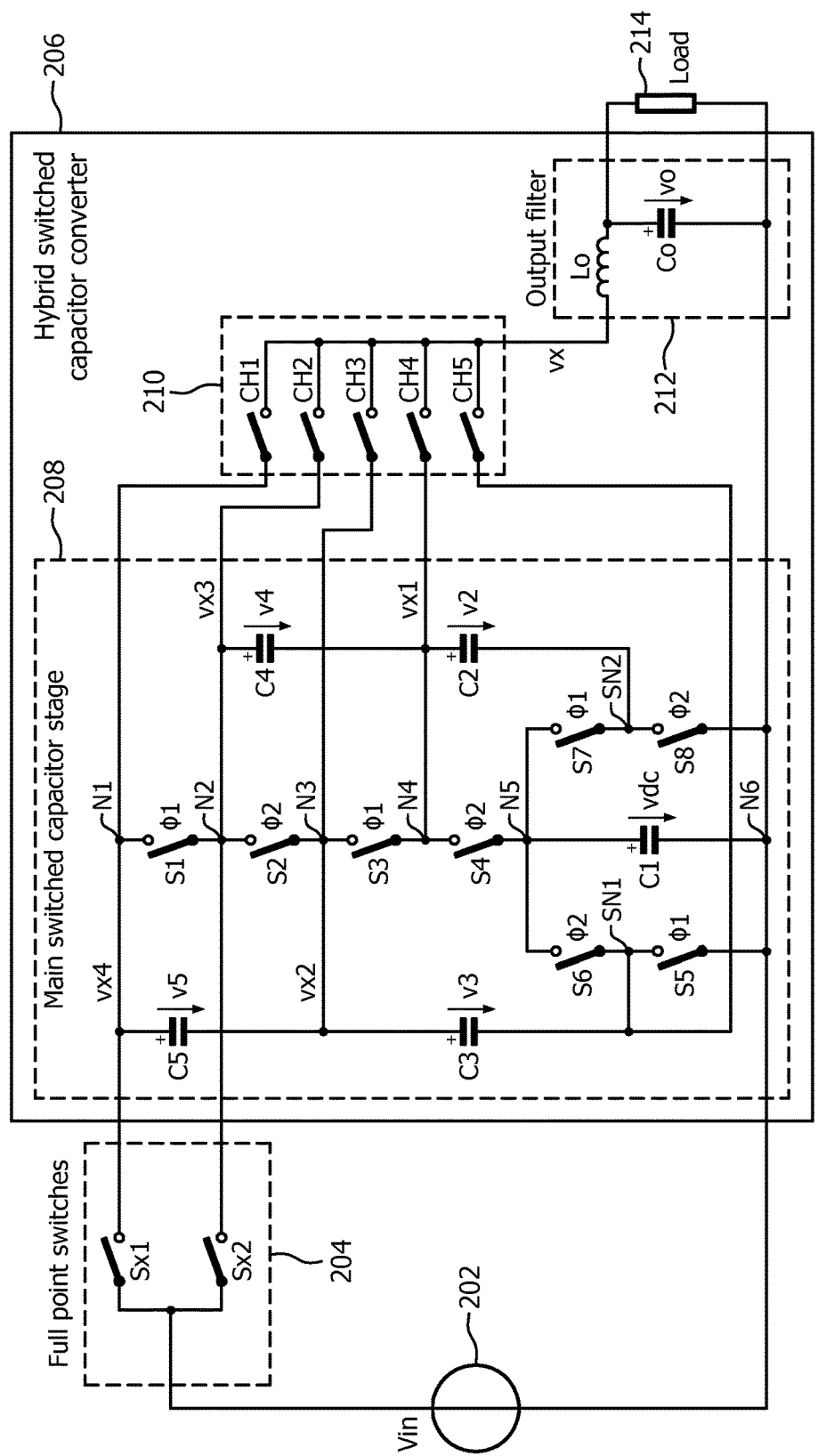
FIG. 10 shows the components of the power conversion device according to an exemplary embodiment of the present invention.

FIG. 10 illustrates a full-point SCC 204 comprising a first switch Sx1 and a second switch Sx2. An input terminal of switch Sx1 is connected to the voltage source 202, and an output terminal of switch Sx1 is connected to central node N1. An input terminal of switch Sx2 is connected to the voltage source 202, and an output terminal of switch Sx2 is connected to central node N2.

The full-point SCC 204 can be controlled in accordance with one of two switch configurations.

In a first switch configuration, switches Sx1 and Sx2 are turned off during a first time phase Φ1, and during a second time phase Φ2 switch Sx1 is turned on and switch Sx2 is turned off whilst switches Sx2 and Sx4 are turned off. That is during the second time phase Φ2 the voltage Vin is supplied to a first central node N1 of the H-SCC 206.

In a second switch configuration, switch Sx1 is turned off and switch Sx2 is turned on during a first time phase Φ1, and during a second time phase Φ2 switches Sx1 and Sx2 are turned off. That is during the first time phase Φ1 the voltage Vin is supplied to a second central node N2 of the H-SCC 206.

That is, the conversion ratio of the power conversion device 200 can be configured by controlling the switch configuration of the full-point SCC 204 as described in Table 2 below.

TABLE 2

| Switch configurations of the full-point SCC 204 | | | | |
| --- | --- | --- | --- | --- |
| Conversion | Phase Φ1 | | Phase Φ2 | |
| Ratio | Sx1 | Sx2 | Sx1 | Sx2 |
| 5:1 | OFF | OFF | ON | OFF |
| 4:1 | OFF | ON | OFF | OFF |

As shown in Table 2, when the full-point SCC 204 operates in a first operating mode (in accordance with the first switch configuration described above), the power conversion device 200 operates as a 5:1 voltage divider i.e. a divide-by-five voltage divider (has a first conversion ratio, M1 (1/5)). When the full-point SCC 204 operates in a second operating mode (in accordance with the second switch configuration described above), the conversion ratio of the power conversion device 200 is reduced by 1, in this case the power conversion device 200 operates as a 4:1 voltage divider i.e. a divide-by-4.5 voltage divider (has a second conversion ratio, M2 (1/4)).

When operating as a 4:1 voltage divider, the output voltages of the SCC stage 208 can be found:

$$vx4: \quad V_{in}(\phi 1) \quad \text{and} \quad \tfrac{5}{4}V_{in}(\phi 2)$$

$$vx3: \quad V_{in}(\phi 1) \quad \text{and} \quad \tfrac{3}{4}V_{in}(\phi 2)$$

$$vx2: \quad \tfrac{2}{4}V_{in}(\phi 1) \quad \text{and} \quad \tfrac{3}{4}V_{in}(\phi 2)$$

$$vx1: \quad \tfrac{2}{4}V_{in}(\phi 1) \quad \text{and} \quad \tfrac{1}{4}V_{in}(\phi 2)$$

$$SN1: \quad 0(\phi 1) \quad \text{and} \quad \tfrac{1}{4}V_{in}(\phi 2)$$

Figure 11:
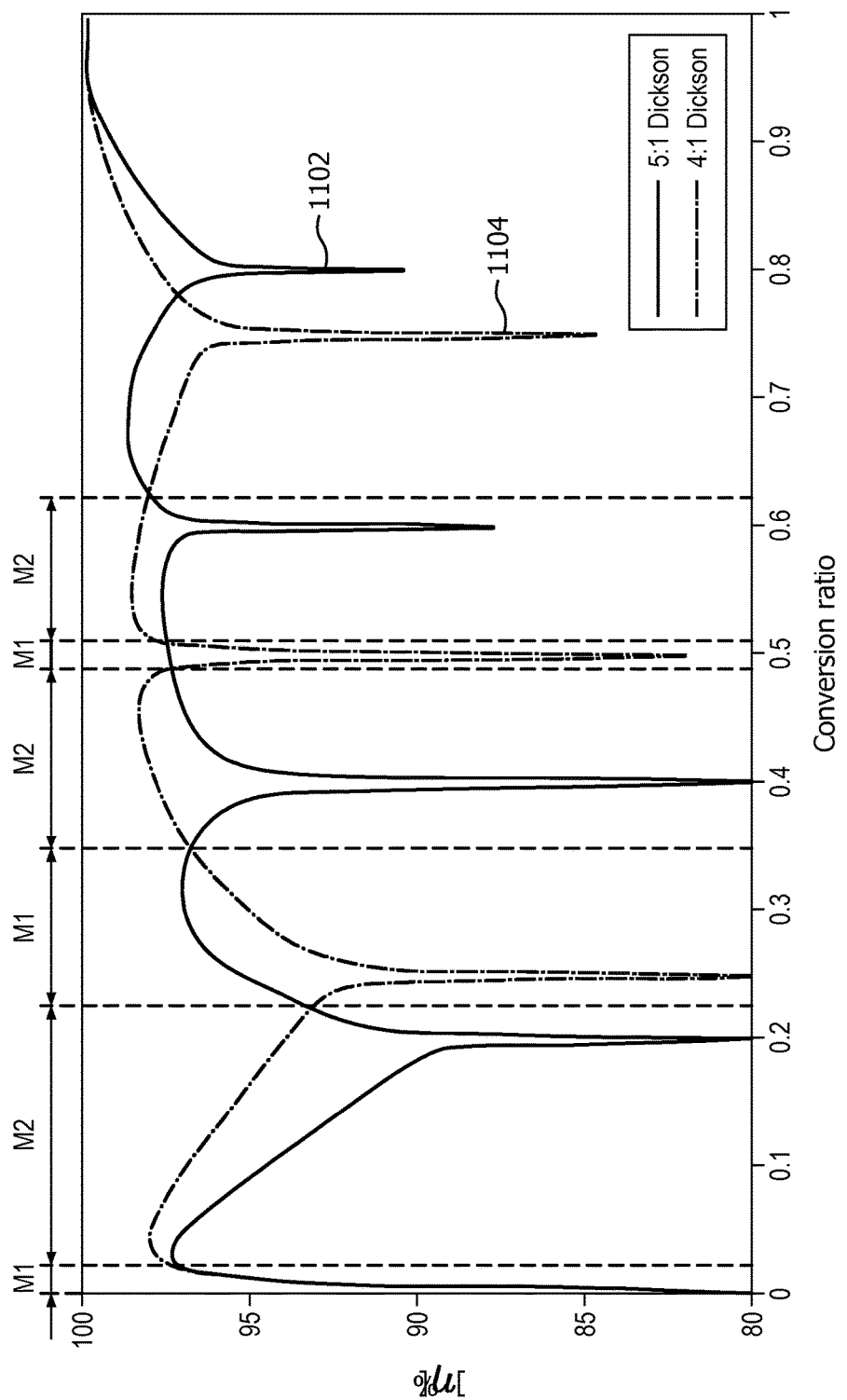
FIG. 11 illustrates an efficiency vs conversion ratio curve of a H-SCC stage of the power conversion device when operating as a 5:1 voltage divider and as a 4:1 voltage divider.

FIG. 11 illustrates an efficiency vs conversion ratio curve 1102 of the power conversion device 200 when operating as a 5:1 voltage divider an efficiency vs conversion ratio curve 1104 of the power conversion device 200 when operating as a 4:1 voltage divider When the H-SCC stage 206 is operating in one of the operating zones marked as M1, the controller 216 controls the H-SCC stage 206 to operate as a 5:1 voltage divider (first conversion ratio, M1). When the H-SCC stage 206 is operating in one of the operating zones marked as M2, the controller 216 controls the H-SCC stage 206 to operate as a 4.5:1 voltage divider (second conversion ratio, M2). This enables the efficiency notches to be overcome thereby providing improved efficiency performance.

In the embodiments described above whereby the conversion ratio control stage 204 is placed at the power line input before the H-SCC stage 206, the operating mode of the conversion ratio control stage 204 is switched to shift the conversion ratio of the H-SCC stage 206, whilst the switching configuration of the SCC stage 208 remains constant.

As described above, as an alternative to being placed at the power line input before the H-SCC stage 206, the conversion ratio control stage 204 may be integrated within the H-SCC 206 stage (as shown in FIG. 2b).

Figure 12:
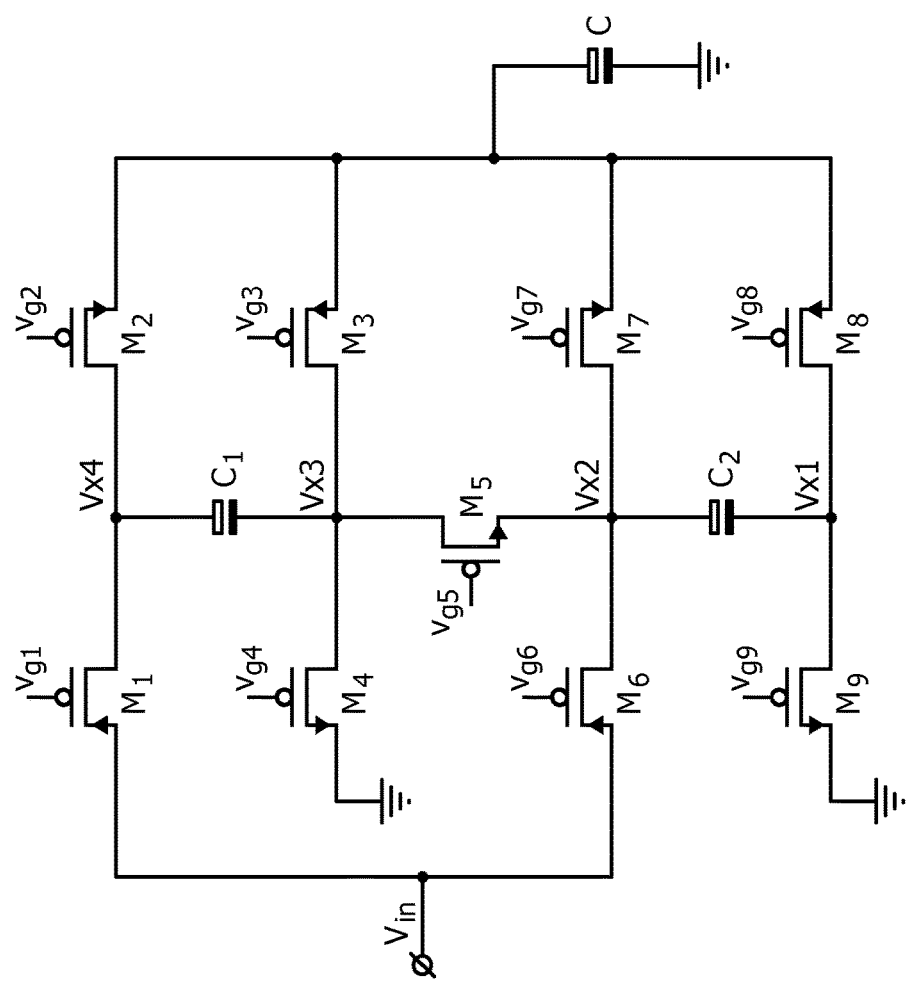
FIG. 12 illustrates an example architecture whereby the conversion ratio control stage is integrated within the H-SCC stage 206.

In these alternative embodiments, both the operating mode of the conversion ratio control stage 204 and the switching configuration of the SCC stage 208 is switched to shift the conversion ratio of the H-SCC stage 206, FIG. 12 illustrates an example arrangement whereby the conversion ratio control stage 204 is integrated within the H-SCC stage 206. In particular, FIG. 12 shows the coupling of the conversion ratio control stage 204 with the SCC stage 208 of the H-SCC stage 206.

In FIG. 12 the SCC stage 208 is 3:2 voltage divider comprising switches M1, M2, M3, M5, M6, M8 and M9.

In a first switch configuration of the SCC stage 208, during a first time phase Φ1, switches M1, M3, M6 and M8 are turned on whilst switches M2, M5 and M9 are turned off, and during a successive second time phase Φ2, the states of all the switches M1-M3, M5, M6, M8, and M9 are reversed. The controller 216 is configured to generate the PWM signals to control the switches (M1, M2, M3, M5, M6, M8 and M9) in the first time phase Φ1 and the second time phase Φ2 as described above.

In the example shown in FIG. 12, the conversion ratio control stage 204 comprises switches M4 and M7. When operating in a first operating mode, switches M4 and M7 of the conversion ratio control stage 204 are turned off in both the first time phase Φ1 and the second time phase Φ2. When the conversion ratio control stage 204 is controlled to operate in the first operating mode, and the SCC stage 208 is controlled in accordance with the first switch configuration described above, the SCC stage 208 operates as a 3:2 voltage divider.

When operating as a 3:2 voltage divider, the output voltages of the SCC stage 208 can be found:

$$vx4: \quad V_{in}(\phi 1) \quad \text{and} \quad \tfrac{2}{3}V_{in}(\phi 2)$$

$$vx3: \quad \tfrac{2}{3}V_{in}(\phi 1) \quad \text{and} \quad \tfrac{1}{3}V_{in}(\phi 2)$$

$$vx2: \quad V_{in}(\phi 1) \quad \text{and} \quad \tfrac{1}{3}V_{in}(\phi 2)$$

$$vx1: \quad \tfrac{2}{3}V_{in}(\phi 1) \quad \text{and} \quad 0(\phi 2)$$

In order to extend the output conversion ratio range of the 3:2 voltage divider, the controller 216 is operable to switch the operating mode of the conversion ratio control stage 204 to a second operating mode and change the switch configuration of the SCC stage 208.

In a second switch configuration of the SCC stage 208, during a first time phase Φ1, switches M1, M3, M6 and M8 are turned on (as in the 3:2 voltage divider operation) whilst switches M2, M4, M7 and M9 are turned off, and during a successive second time phase Φ2, the states of all the switches are reversed. Switch M5 is turned off during both the first time phase Φ1 and the second time phase Φ2. The controller 216 is configured to generate the PWM signals to control the switches (M1-M4 & M6-M9) in the first time phase Φ1 and the second time phase Φ2 as described above.

When operating in a second operating mode, switches M4 and M7 of the conversion ratio control stage 204 are turned off in the first time phase Φ1 and turned on in the second time phase Φ2. When the conversion ratio control stage 204 is controlled to operate in the second operating mode, and the SCC stage 208 is controlled in accordance with the second switch configuration described above, the SCC stage 208 operates as a 2:1 voltage divider.

When operating as a 2:1 voltage divider, the output voltages of the SCC stage 208 can be found:

$$vx4: \quad V_{in}(\phi 1) \quad \text{and} \quad \tfrac{1}{2}V_{in}(\phi 2)$$

$$vx3: \quad \tfrac{1}{2}V_{in}(\phi 1) \quad \text{and} \quad 0(\phi 2)$$

$$vx2: \quad V_{in}(\phi 1) \quad \text{and} \quad \tfrac{1}{2}V_{in}(\phi 2)$$

$$vx1: \quad \tfrac{1}{2}V_{in}(\phi 1) \quad \text{and} \quad 0(\phi 2)$$

Figure 13:
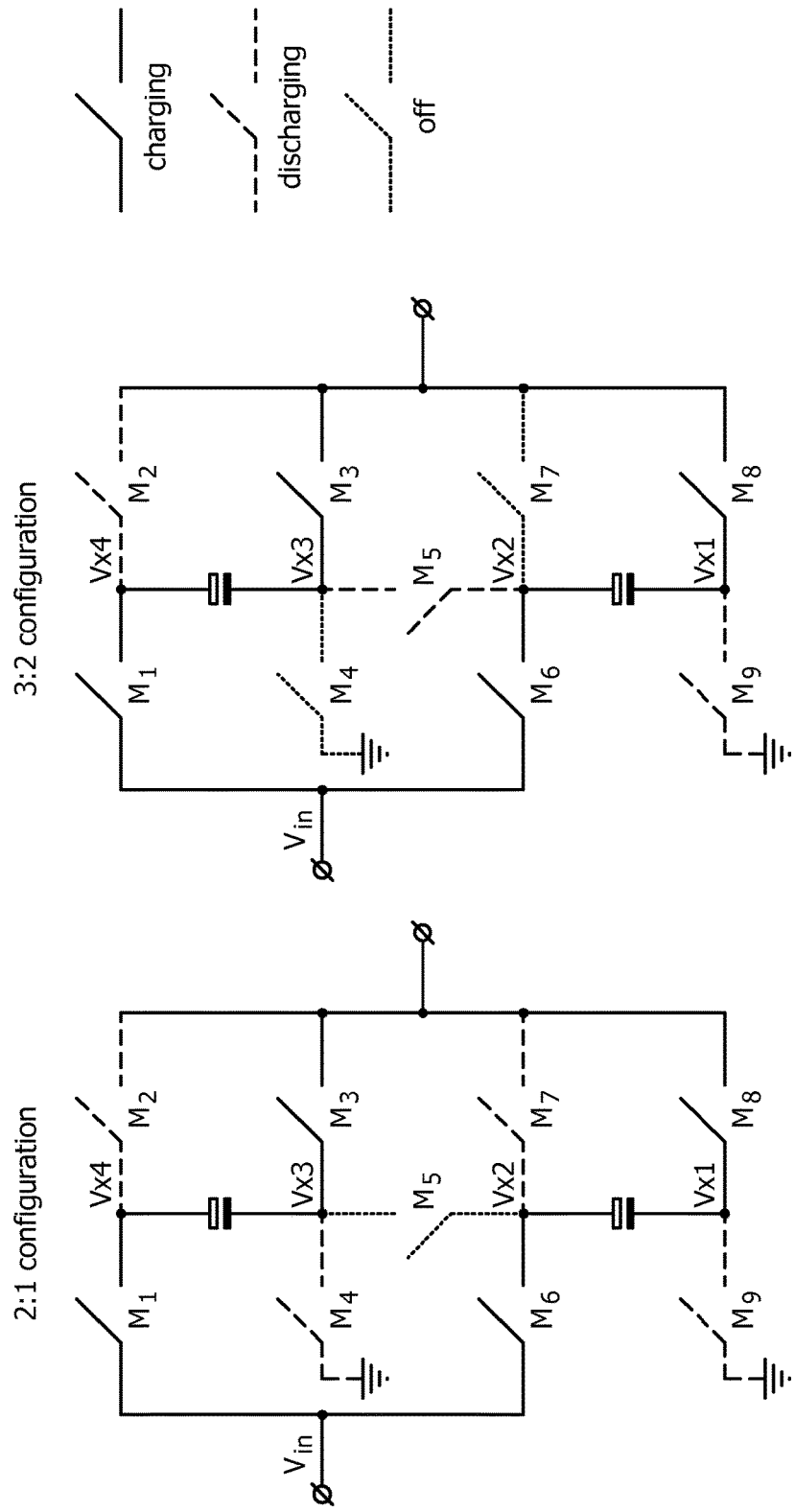
FIG. 13 illustrates the switching states of switches in a power conversion module of the H-SCC stage and in the conversion ratio control stage in an exemplary embodiment of the present invention in accordance with the architecture of FIG. 12.

The states of switches M1-M9 when the SCC stage 208 is controlled to operate as both the 3:2 voltage divider and the 2:1 voltage divider is illustrated in FIG. 13.

In the example arrangement shown in FIG. 12, if the output filter 212 of the H-SCC stage 206 is connected to node Vx4, this node will provide an output voltage providing two conversion ratios. When the SCC stage 208 is configured as a 2:1 voltage divider, node Vx4 will provide a conversion ratio of: Vo/Vin=(2−D)/2 (whereby D is the duty cycle of the PWM signals provided to the switches of the SCC stage 208). When the SCC stage 208 is configured as a 3:2 voltage divider, node Vx4 will provide a conversion ratio of: Vo/Vin=(3-D)/3.

Embodiments of the present invention extend to conversion ratio control stage 204 implementations that shift the conversion ratio of the H-SCC stage 206 by other amounts than described in the examples provided herein.

In embodiments, the change in conversion ratio of the H-SCC stage 206 results in a shift of the efficiency curve which enables the efficiency notches to be overcome. There is a trade of between the amount of conversion ratio shift and the ripple applied to the inductor. When the conversion ratio is decreased (shifted) the voltage ripple in the inductor increases, which requires a bigger inductor, therefore compromising the volume of the entire system. Therefore the larger the conversion ratio shift, the larger the increase in voltage ripple in the inductor, and a larger inductor is required.

All the switches S1 to S8, and M1 to M9 as in the illustrated exemplary embodiments can be bi-directional and implemented in a suitable technology that is compatible with the switching frequency of the circuit. For instance the switches can be formed by Metal Oxide Semiconductor Field Effect Transistors (MOSFET) on a silicon substrate or High Electron Mobility Transistors (HEMT) on a Gallium-Nitride substrate.

All the elements comprised in the embodiments described above can be sized small enough to enable integration, for example as a Power System on a Chip (PSoC) or Power System in a Package (PSiP). In the illustrated exemplary embodiment, the capacitance for all capacitors can be set to 100 nF; the capacitance values can be further optimized in order to achieve a better performance. The inductance value of the filter inductor Lo can be set to 200 nH, making it possible to be printed in an LED sub-mount with a surface of 5×5 mm. For example, a LED package can be designed so as to comprise at least one LED and a driver comprising a power conversion device as described in the different embodiments.

The capacitors can also be implemented using a technology similar to that applied to Ferroelectric Random Access Memory (FRAM) or embedded Dynamic Random Access Memory (eDRAM). The higher dielectric constant achieved with such technologies makes the integrated SCCs smaller and thus cheaper.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For example, the embodiments that are described above relate to power conversion modules being formed by a SCC of a specific topology, while any other type of power converter may be used.

It is to be noticed that though mostly applications wherein the load is a light source are described herein, the current invention can also apply to many systems wherein there is a need for integrated power management units, for example in integrated devices such as implantable or wearable body sensors for sensing physical or physiological parameters, or in integrated energy harvesting units, etc.

Whilst the controller 216 has been shown as being implemented using analogue circuitry, in other embodiments the functionality of the controller 216 may be implemented in code (software) stored on a memory comprising one or more storage media, and arranged for execution on a processor comprising on or more processing units. The code is configured so as when fetched from the memory and executed on the processor to perform operations in line with embodiments discussed above.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed at limiting the scope.

The invention claimed is:

1. Power conversion device, for supplying a load with a Pulse Width Modulation (PWM) signal, comprising an inductive output filter having at least an output configured to be connected to the load, the power conversion device comprising:

a power conversion module supplied by a DC input voltage (Vin) and configured for providing a plurality of output signals (PWM1, PWMn), each of the plurality of output signals is associated to each of the plurality of voltages (Vx1-Vx4, SN1) proportional to a requested conversion ratio wherein a selection module is arranged to receive the plurality of output signals to select one of the plurality of output signals, and to provide the selected output signal (Vx) to the output filter;

a conversion ratio control stage coupled to the power conversion module and defining a first operating mode and a second operating mode wherein when the conversion ratio control stage operates in the first operating mode the power conversion module provides said plurality of output signals in accordance with a first conversion ratio (M1), and when the conversion ratio control stage operates in the second operating mode the power conversion module provides said plurality of output signals in accordance with a second conversion ratio (M2); and a controller configured to: determine a requested conversion ratio (m) based on the DC input voltage (Vin) and a target reference voltage (Vset); and based on the determined requested conversion ratio, control the conversion ratio control stage to operate in one of the first operating mode and the second operating mode.

2. The power conversion device of claim 1, wherein the power conversion device comprises an input for connection to a voltage supply that supplies said DC input voltage, and the conversion ratio control stage is arranged for connection between said input and the voltage supply.

3. The power conversion device of claim 1, wherein the conversion ratio control stage is integrated into the power conversion module.

4. The power conversion device of claim 1, wherein the conversion ratio control stage comprises a plurality of switches, and the controller controls the operating mode of the conversion ratio control stage by controlling a switch configuration of the conversion ratio control stage.

5. The power conversion device of claim 1, wherein the controller is further configured to compare the requested conversion ratio with a plurality of conversion ratio thresholds to determine an operating zone of the power conversion module.

6. The power conversion device of claim 5, wherein the controller is configured to control the conversion ratio control stage to operate in one of the first operating mode and the second operating mode based on the determined operating zone.

7. The power conversion device of claim 5, wherein the controller comprises a plurality of comparators each of said plurality of comparators configured to compare the requested conversion ratio with one of the plurality of conversion ratio thresholds.

8. The power conversion device of claim 1, wherein the controller comprises a divider stage configured to compute the requested conversion ratio by dividing the target reference voltage (Vset) with the DC input voltage (Vin).

9. The power conversion device of claim 1, further comprising a wiring of said one of the plurality of output signals to the output filter.

10. The power conversion device of claim 1, wherein the plurality of output signals have a level amplitude that is a fraction of the input voltage (Vin) level, each output signal being floating with a bias component split in a plurality of steps ranging from a determined lowest fraction level amplitude to a determined highest fraction level amplitude.

11. The power conversion device of claim 1, wherein the power conversion module comprises a Switched Capacitor Converter (SCC), comprising a plurality of switches controlled by the controller.

12. The power conversion device of claim 11, wherein the power conversion module is based on a Dickson ladder topology comprising a first set of switches and a second set of switches.

13. The power conversion device of claim 12, wherein said plurality of output signals (PWM1, PWMn) are formed by the plurality of voltages (vx1, vxn) at respective internal nodes (N1, . . ., N4, SN1) of the power conversion module.

14. The power conversion device of claim 1, wherein said load is a light module comprising at least one light source.

15. The power converter device of claim 11, wherein the controller further adjusts the duty cycle of signals ($\phi 1$, $\phi 2$) controlling the switches for achieving desired conversion ratio.

* * * * *